(12) United States Patent
Batson et al.

(10) Patent No.: US 12,313,300 B2
(45) Date of Patent: May 27, 2025

(54) FUEL ENRICHMENT SYSTEM FOR FUEL-FIRED APPLIANCE

(71) Applicant: Rheem Manufacturing Company, Atlanta, GA (US)

(72) Inventors: Mickey E. Batson, Lavaca, AR (US); Shawn A. Reed, Charleston, AR (US); Tyson J. Cogburn, Roland, OK (US); Nathan T. Whalen, Alma, AR (US); Darryl J. Farley, Fayetteville, AR (US)

(73) Assignee: Rheem Manufacturing Company, Atlanta, GA (US)

( * ) Notice: Subject to any disclaimer, the term of this patent is extended or adjusted under 35 U.S.C. 154(b) by 810 days.

(21) Appl. No.: 17/132,679

(22) Filed: Dec. 23, 2020

(65) Prior Publication Data

US 2021/0215354 A1 Jul. 15, 2021

Related U.S. Application Data

(63) Continuation of application No. 15/457,712, filed on Mar. 13, 2017, now Pat. No. 10,876,744.

(51) Int. Cl.
*F24H 3/08* (2022.01)
*F23D 14/04* (2006.01)
(Continued)

(52) U.S. Cl.
CPC ............. *F24H 3/087* (2013.01); *F23D 14/04* (2013.01); *F23L 15/02* (2013.01); *F23L 17/005* (2013.01);
(Continued)

(58) Field of Classification Search
CPC ......... F23D 14/04; F23L 15/02; F23L 17/005; F24D 19/1084; F24H 3/087; F24H 9/1881; F24H 9/2085
(Continued)

(56) References Cited

U.S. PATENT DOCUMENTS 2,483,298 A * 9/1949 Newman .................... F23N 1/00
431/46
4,242,078 A * 12/1980 Nelson .................... F23N 5/242
431/255
(Continued)

FOREIGN PATENT DOCUMENTS

KR 101400834 B1 * 5/2014
NL 9201847 A * 5/1994 ............. F23D 14/04

OTHER PUBLICATIONS

NL 9201847 A—Translation (Year: 1994).*
(Continued)

*Primary Examiner* — Steven B McAllister
*Assistant Examiner* — Benjamin W Johnson
(74) *Attorney, Agent, or Firm* — Eversheds Sutherland (US) LLP

(57) ABSTRACT

A fuel-fired heating appliance has two fuel flow paths to a burner, each actuatable to a closed state and to an open state. A heat exchanger is in fluid communication with an area proximate the burner. A controller executes the steps: (a) while the first fuel flow path is closed, opening the second flow path; (b) following ignition of fuel flowing from the second flow path, opening the first fuel flow path; and (c) following step (b), closing the second fuel flow path while opening the first fuel flow path.

14 Claims, 10 Drawing Sheets

(51) Int. Cl.
*F23L 15/02* (2006.01)
*F23L 17/00* (2006.01)
*F24D 19/10* (2006.01)
*F24H 9/1881* (2022.01)
*F24H 9/20* (2022.01)

(52) U.S. Cl.
CPC ....... *F24D 19/1084* (2013.01); *F24H 9/1881* (2013.01); *F24H 9/2085* (2013.01)

(58) Field of Classification Search
USPC ......................................................... 122/116
See application file for complete search history.

(56) References Cited

U.S. PATENT DOCUMENTS

| | | | | |
|---|---|---|---|---|
| 4,717,334 | A | * | 1/1988 | Newman ................. F23D 14/22 239/434.5 |
| 5,453,002 | A | * | 9/1995 | Scott ........................ F23Q 9/08 431/6 |
| 6,880,548 | B2 | | 4/2005 | Schultz et al. |
| 2005/0048427 | A1 | * | 3/2005 | Brown ................... F23L 17/005 126/116 A |
| 2014/0020669 | A1 | * | 1/2014 | Sherrow ................. F24H 3/087 126/110 C |

OTHER PUBLICATIONS

KR 101400834 B1—Translation (Year: 2014).*
American National Standard ANSI Z21.47-2016. Gas-Fired Central Furnaces.
An American National Standard National Fuel Gas Code, ANSI Z223.1, 2015 Edition.
National Fuel Gas Code Section 9.6.5.1 (A), ANSI Z223.1, 2015 Edition.
Errata for National Fuel Gas Code 2015 Edition dated Oct. 3, 2016.

* cited by examiner

FUEL ENRICHMENT SYSTEM FOR FUEL-FIRED APPLIANCE

CROSS REFERENCE TO RELATED APPLICATIONS

This present application is a continuation of U.S. patent application Ser. No. 15/457,712 filed 13 Mar. 2017, now U.S. Pat. No. 10,876,744, the entire disclosure of which is hereby incorporated by reference.

FIELD OF THE INVENTION

The present invention generally relates to fuel-fired heating appliances, such as furnaces, water heaters, and boilers.

BACKGROUND OF THE INVENTION

Nitrogen oxide (NOx) emissions in fuel-fired heating appliances such as furnaces, water heaters and boilers, are a product of a combustion process from the appliance. Nitrogen is generally inert at ambient temperature but may bond with oxygen, thereby forming NOx emissions, at high temperature conditions (sufficient to dissociate triple bound nitrogen molecules) that may be encountered in the combustion process. In the use of atmospheric-type burners by such appliances, gas flow from a gas source ignites about the burner surface as it mixes with air that is allowed to flow to the combustion chamber and the burner via unrestricted pathways from an area ambient to the appliance. The air supply is unregulated, and while the relatively large amount of inflowing air to the burner can provide a correspondingly high degree of combustion in a short period of time, and thereby permit a quick delivery of heat from start up, the unregulated amount of air within the combustion chamber can give rise to a relatively large amount of air not used in the combustion process and, therefore, to NOx emissions.

NOx emissions have been the subject of environmental concern and regulation for many decades, and regulations may apply to limit the amounts of such emissions. The South Coast Air Quality Management District (SCAQMD) issued Rule 1111 (1984) establishing a forty nanogram/joule (ng/J) limit for furnaces that has become generally understood as a threshold for "low NOx" furnaces. In 2014, that limit was reduced to 14 ng/J. Devices that operate at or below 20 ng/J, or sometimes at or below 14 ng/J, are sometimes referred to as "ultra low NOx" devices (e.g. burners) or "ULN" devices.

Systems have been developed that reduce NOx emissions. A premix burner, for example as shown in U.S. Pat. No. 6,880,548, may regulate the in-flow of air and can thereby be used to control the amount of excess air (i.e. the amount of air beyond that which combusts in the combustion chamber) supplied to the combustion area and, therefore, the amount of NOx remaining after combustion. A premix burner blends air and fuel prior to the combustion process. Resulting mixtures typically include the air needed for combustion, plus a percentage of excess air to provide an operational margin. In addition, the premixing of fuel and air increases the burning velocity or speed of the combustion process, thereby helping to avoid heating air otherwise not required for complete combustion to, in turn, reduce the formation of thermal NOx typically presented with furnace diffusion flame burner systems. It is also known to reduce thermal NOx by controlling the fuel/air mixture and related flame structure to proportionally minimize reactions with nitrogen as compared with diffusion type burners.

Premix burners can be prone to rough ignition during startup. Because the fuel and air are mixed before reaching the burner surface, the mixture can ignite as it flows through discrete holes or mesh openings in the burner, creating discrete, individual flames at respective such holes that all try to stabilize, thereby creating multiple, individual pressure pulses that generate noise.

As should be understood, gas-fired furnaces can be considered to be either of a "condensing" or "non-condensing" type, depending on the furnace's equilibrium temperature, where the equilibrium temperature is a temperature to which the furnace warms and stabilizes from a cold start. As should be understood generally, a furnace's equilibrium temperature may be considered the temperature at which exhaust gas leaving the furnace into the external flue pipe stabilizes during the furnace's use or the temperature at which the combustion chamber stabilizes during the furnace's use, and the term may be used herein in either manner, depending on the context of the discussion. With regard to the distinction between condensing and non-condensing furnaces, however, the equilibrium temperature refers to the temperature of the exhaust gas leaving the furnace.

In conventional practice, condensing furnaces operate at efficiencies greater than 90%. This corresponds to the condensing furnace having a relatively low equilibrium temperature (in the sense of exhaust gas temperature at the flue pipe), and in particular having an equilibrium temperature that is below the dew point. Because the exhaust gas from such furnaces therefore tends to condense in the flue extending from the furnace, these furnaces typically have flue pipes made from non-metallic materials such as polyvinylchloride (PVC) on which condensate may form without damaging the flue. Because the temperature of the exhaust gas is relatively low, the exhaust has less heat by which to drive its own flow up and out of the flue pipe. Accordingly, a condensing furnace has an induced draft blower at the end of the furnace heat exchanger to pull exhaust from the burner and through the heat exchanger and then push the exhaust outward into and through the flue pipe. To maintain positive pressure in the flue in order to keep the exhaust flowing away from the furnace, the flue pipe connected to the inducer output has a relatively small diameter, is gas-impermeable, without through-holes, and is sealed to the inducer output, so that the inducer is able to create a relatively high pressure in the flue pipe that can be maintained along the flue pipe's length. The flue pipe may be directed downward from the induced draft blower to a trap so that, as condensate forms on the inner flue surface, the condensate drains to the trap, and from the trap to a drain in the building's drain system. From the trap, the flue may turn upward and extend out of the building to thereby remove the gaseous exhaust. Such condensing furnaces use inshot-type burners, from which combustion exhaust gas is drawn by the induced-draft blower.

The equilibrium temperature of a lower-efficiency, non-condensing furnace is above the dew point. While there could be some condensation in the flue pipe from a non-condensing furnace as the furnace warms from a cold start to its equilibrium temperature, the effect is eliminated or inconsequential because the warm up period is short. Due to the higher temperature of its exhaust gas, and the resulting elimination of condensate, the non-condensing furnace flue can be made of metal and can extend straight upward from the furnace. In "80+" non-condensing furnaces, i.e. furnaces having an efficiency greater than 80% (but not exceeding 82%), the flue pipe is a solid-walled, gas-impermeable tube (i.e. without through-holes) that is sealingly attached to the outlet of the furnace's heat exchanger. The high-temperature exhaust gas creates sufficient upward flow to generate a negative pressure in the flue pipe and thereby continuously draw exhaust gas from the furnace, without blower assistance, although blowers may be used to enhance flow. Certain non-condensing furnaces of lower efficiency (around 72%), and therefore higher exhaust gas temperature, did not have an induction blower, but a gap was provided between the exhaust gas outlet at the furnace housing and the input to the building flue pipe, so that the rising exhaust gas draws in ambient air to assist in the outward flow.

All else being equal, a furnace with a pre-mix burner should warm up more slowly than a furnace with an atmospheric type burner, because the premix burner draws less air to the burner.

It is an object of the present invention to provide an improved NOx reduction appliance.

SUMMARY OF THE INVENTION

In one or more embodiments of the present invention, a fuel-fired heating appliance has a burner, a first fuel flow path between a first fuel source and the burner, a second fuel flow path between a second fuel source and the burner, and an air flow path between an air source and the burner. The first fuel flow path is actuatable to a closed state in which fuel from the first fuel source does not flow through the first fuel flow path and to an open state in which fuel from the first fuel source can flow through the first fuel flow path. The second fuel flow path defines an outlet within the first fuel flow path and is actuatable to a closed state in which fuel from the second fuel source does not flow through the second fuel flow path and an open state in which fuel from the second fuel source can flow through the second fuel flow path. A heat exchanger defines an interior volume in fluid communication at an input end of the heat exchanger with an area proximate the burner so that combustion gas generated by combustion of fuel and air at the burner is received through the input end into the interior volume. A controller is in operative communication with the first fuel flow path and the second fuel flow path. A computer readable medium contains program instructions executable by the controller to cause the controller to execute the steps: (a) while the first fuel flow path is in the closed state of the first fuel flow path, actuating the second fuel flow path to the open state of the second fuel flow path; (b) following ignition of fuel flowing from the outlet, actuating the first fuel flow path to the open state of the first fuel flow path; and (c) following step (b), actuating the second fuel flow path to the closed state of the second fuel flow path while actuating the first fuel flow path to the open state of the first fuel flow path.

In another embodiment of the present invention, a fuel-fired heating appliance has a burner, a first fuel flow path between a first fuel source and the burner, a second fuel flow path between a second fuel source and the burner, and an air flow path between an air source and the burner. A first valve is disposed in the first fuel flow path so that, in a first state of the first valve, the first valve blocks flow of fuel through the first fuel flow path and, in a second state of the first valve, the first valve allows fuel flow through the first fuel flow path. The second fuel flow path defines an outlet within the first fuel flow path. A second valve is disposed in the second fuel flow path so that, in a first state of the second valve, the second valve blocks flow of fuel through the second fuel flow path and, in a second state of the second valve, the second valve allows fuel flow through the second fuel flow path. A heat exchanger defines an interior volume in fluid communication at an input end of the heat exchanger with an area proximate the burner so that combustion gas generated by combustion of fuel and air at the burner is received through the input end into the interior volume. A first blower is disposed with respect to the heat exchanger so that actuation of the first blower moves air over an exterior of the heat exchanger. An igniter is proximate the outlet so that actuation of the igniter ignites fuel flowing from the outlet. A controller is in operative communication with the first valve, the second valve, and the igniter. A computer readable medium contains program instructions executable by the controller to cause the controller to execute the steps: (a) while the first valve is in the first state of the first valve, actuating the second valve to the second state of the second valve, (b) actuating the igniter to ignite fuel flowing from the outlet, (c) following ignition of the fuel flowing from the outlet, actuating the first valve to the second state of the first valve, and (d) following step (c), actuating the second valve to the first state of the second valve while actuating the first valve to the second state of the first valve.

In a still further embodiment of the present invention, a fuel-fired heating appliance has a burner, a first fuel flow path between a first fuel source and the burner, a second fuel flow path between a second fuel source and the burner, and an air flow path between an air source and the burner. A first valve is disposed in the first fuel flow path so that, in a first state of the first valve, the first valve blocks flow of fuel through the first fuel flow path and, in a second state of the first valve, the first valve allows fuel flow through the first fuel flow path. The second fuel flow path defines an outlet within the first fuel flow path. A second valve is disposed in the second fuel flow path so that, in a first state of the second valve, the second valve blocks flow of fuel through the second fuel flow path and, in a second state of the second valve, the second valve allows fuel flow through the second fuel flow path. A third valve is disposed in the second fuel flow path so that in a first state of the third valve, the third valve blocks flow of fuel through the second fuel flow path and, in a second state of the third valve, the third valve allows fuel flow through the second fuel flow path. The third valve is a pilot valve to the first valve, so that the first valve is in the first state of the first valve if the third valve is in the first state of the third valve. A heat exchanger defines an interior volume in fluid communication at an input end of the heat exchanger with an area proximate the burner so that combustion gas generated by combustion of fuel and air at the burner is received through the input end into the interior volume. A first blower is disposed with respect to the heat exchanger so that actuation of the blower moves air over an exterior of the heat exchanger. A chamber in fluid communication with the area is disposed in the first fuel flow path and in the air flow path so that fuel from the first fuel source and air from the air source mix in the chamber, thereby forming a fuel-air mixture. A second blower is in fluid communication with an output of the heat exchanger and, thereby, with the area and the chamber so that actuation of the blower draws the fuel-air mixture from the chamber to the area and draws combustion gas through the heat exchanger to the blower. An igniter is proximate the outlet so that actuation of the igniter ignites fuel flowing from the outlet. A controller is in operative communication with the first valve, the second valve, the third valve, the second blower, and the igniter. A computer readable medium containing program instructions executable by the controller to cause the controller to execute the steps: (a) while the first valve is in the first state of the first valve, actuating the second valve to the second state of the second valve, actuating the third valve to the second state of the third valve, and actuating the second blower, (b) actuating the igniter to ignite fuel flowing from the outlet, (c) following ignition of the fuel flowing from the outlet, actuating the first valve to the second state of the first valve, and (d) following step (c), actuating the second valve to the first state of the second valve while actuating the first valve to the second state of the first valve and the third valve to the second state of the third valve.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
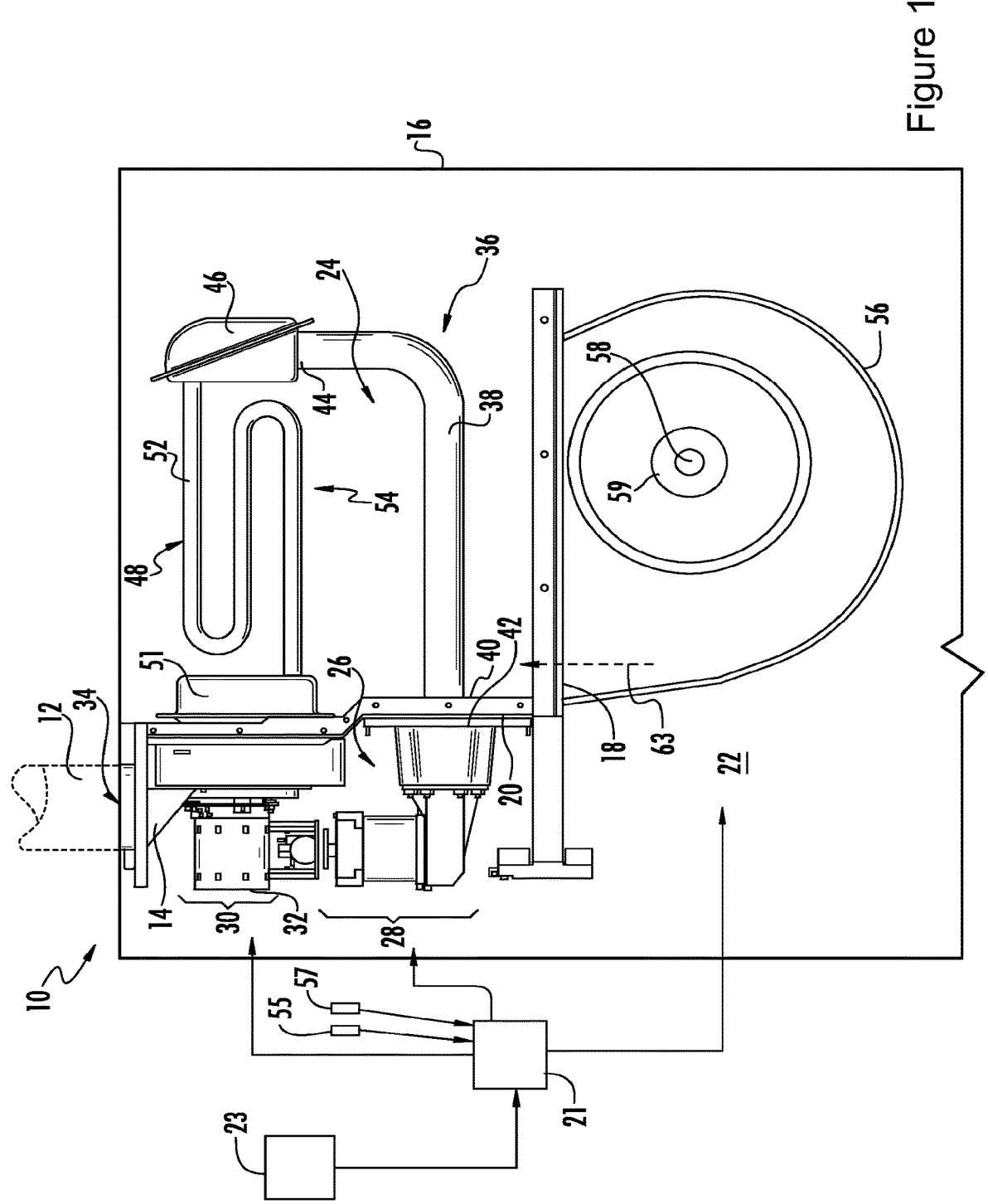
FIG. 1 is a partial schematic elevational view of a non-condensing fuel-fired forced air heating furnace having incorporated a NOx reducing device(s) having a premix burner assembly, in accordance with an embodiment of the present invention.

Repeat use of reference characters in the present specification and drawings is intended to represent same or analogous features or elements of the invention according to the disclosure.

DESCRIPTION OF THE PREFERRED EMBODIMENTS

Reference will now be made in detail to embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used herein, terms referring to a direction or a position relative to the orientation of the fuel-fired heating appliance, such as but not limited to "vertical," "horizontal," "upper," "lower," "above," or "below," refer to directions and relative positions with respect to the appliance's orientation in its normal intended operation, as indicated in the Figures herein. Thus, for instance, the terms "vertical" and "upper" refer to the vertical direction and relative upper position in the perspectives of the Figures and should be understood in that context, even with respect to an appliance that may be disposed in a different orientation.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provided illustrative examples for the terms. The meaning of "a," "an," and "the" may include plural references, and the meaning of "in" may include "in" and "on." The phrase "in one embodiment," as used herein does not necessarily refer to the same embodiment, although it may.

FIG. 1 illustrates a representative fuel-fired heating appliance, e.g. a non-condensing, "80+" forced air heating furnace 10, having incorporated a NOx reducing device(s) in accordance with one or more embodiments of the present invention. In a manner subsequently described, ambient air input into the flue functions to lower an amount of condensation on a flue pipe that would otherwise accumulate during an extended warm-up period during the operation of furnace 10.

Furnace 10 is a forced air appliance to be used in a heating, ventilation, and air conditioning (HVAC) system of a building. In a forced air system, an air handler connects to a ductwork ventilation system that distributes air as part of the HVAC system and returns it to the air handler. An air handler blower draws air from a temperature conditioned space within the building through the ductwork ventilation system. The ductwork is in fluid communication with an input flange (not shown) of a housing 16 of furnace 10 that surrounds an opening through housing 16. A lower portion of housing 16 encloses a plenum 22 in which an air handler blower 56 is disposed. The blower has an input thereto that is fluidly connected to the opening in housing 16 that connects to the ductwork so that the blower draws air from the conditioned space via the ductwork and the opening into the blower and having an output fluidly connected to an opening through an interior partition 18 separating plenum 22 from a flow passage 24 in the interior of furnace housing 16 so that air handler blower 56 pushes the received air into flow passage 24 so that the air passes over a heat exchanger 36 and moves through a through-outlet (not shown) of housing 16 and into outlet ductwork attached to the output side of housing 16 that directs the now-warmed air back into the conditioned space. A thermostat 23 mounted within the conditioned space has a temperature sensor that senses temperature in the conditioned space. A processor or temperature responsive mechanical device in the thermostat compares the temperature to a set point temperature set by a user through an interface at the thermostat and, depending on that comparison, may send a signal to a controller 21 requesting that the controller actuate the furnace or, more specifically, actuate the burner (discussed below) to provide warm combustion exhaust to the heat exchanger and actuate air handler blower 56 to move air over the heat exchanger.

While the illustrated embodiment is a forced air furnace, it should be understood that other embodiments may be realized in other appliances, for example water heaters and boilers. Thus, for example, the heat exchanger in a gas-fired water heater may be a flue pipe that extends through the water tank interior, which communicates with a secondary flue pipe outside the water heater. Accordingly, while the present discussion presents one or more embodiments in the form of a furnace, it should be understood that this is for purposes of example only, and that the present invention may be embodied in other appliances.

Outer housing 16 connects to respective horizontal and vertical partition members 18, 20 (which may be considered part of the housing) that divide the interior of housing 16 into return air plenum 22, supply air flow passage 24, and an equipment chamber 26. Each partition may be a generally sheet-like structure. Horizontal partition member 18 divides the interior of housing 16 into return air plenum 22 and supply air flow passage 24 so that the only fluid communication between the two areas is the through-hole (indicated by arrow 63) through which flows air from plenum 22, pushed by the output of blower 56. Air handler blower 56 pulls air from the ducting from the conditioned space, as discussed above, into plenum 22 and pushes the received air into supply air flow passage 24 through that hole. Equipment chamber 26 is also positioned above horizontal partition 18 but to the left of vertical partition 20 and flow passage 24. Similar to partition 18, partition 20 completely separates its opposing chamber except for one or more through-holes as described herein. Housing 16 encloses furnace 10 except for air entrances, a flue exit, and service doors.

Equipment chamber 26 encloses a low NOx burner assembly 28. Above burner assembly 28, and also to the left of vertical partition member 20, is an induction draft blower 30. Blower 30 has a motor 32, a flue adaptor 14, which may include an ambient air inlet as described below, and an upwardly facing outlet 34 connectable to external exhaust flue 12.

Operatively disposed within supply air flow passage 24 is a combustion heat exchanger 36 having a primary heat exchanger portion defined by two L-shaped metal combustion output tubes 38 (one of which is visible in FIG. 1). Each of the L-shaped metal tubes 38 has two ends. An open first end 40 is connected to an end of a burner outlet 42 so that the end of tube 38 is in fluid communication with burner outlet 42 to receive combustion gases therefrom, and an open second upward turned end is connected to and in fluid communication with an inlet manifold 46 to deliver the combustion gases thereto.

Heat exchanger 36 also includes a secondary heat exchanger section 48 that is disposed within an upper portion of air flow passage 24 and that includes inlet manifold 46 connected to upward turned end 44 of L-shaped metal combustion output tubes 38, and an outlet manifold 51 connected to and in fluid communication with an inlet of induction draft blower 30. The interiors of inlet and outlet manifolds 46, 51 are communicated to each other by a plurality of vertically serpentine, or coiled, metal secondary heat exchanger tubes 52 that are horizontally spaced apart from each other in a front-to-rear direction (i.e. into and out of the page view of FIG. 1) and connected at their opposite ends to and in fluid communication with inlet and outlet manifolds 46, 51. Only one of tubes 52 is visible in FIG. 1, the remaining tubes 52 being positioned behind single visible tube 52. As illustrated, each tube 52 has a diameter smaller than the diameter of each tube 38.

The configuration of air handler blower 56 may vary as desired, but, in the illustrated embodiment, the blower is a squirrel-cage blower with a finned ring driven by an induction electric motor 59 so that air enters blower 56 from the ductwork through an inlet 58 and exits the blower through an outlet into plenum 22. Air 54 forced upwardly by blower 56 through supply air passage 24 moves over tubes 38 and 52 and is then discharged through a housing outlet opening (not shown) for delivery by supply ductwork (not shown) to the conditioned space served by furnace 10.

At the same time, operation of a gas burner in low NOx burner assembly 28 creates flames that are drawn into open left end 40 of primary combustion outlet tubes 38 by the operation of induction draft blower 30, which creates a negative pressure within heat exchanger tubes 52, manifolds 46 and 51, and tubes 38. This negative pressure is therefore also present at the burner's surface. The flames generate hot combustion gases that blower 30 draws sequentially through tubes 38, inlet manifold 46, tubes 52, and outlet manifold 51, and then discharges to atmosphere via exhaust flue pipe 12. As air 54 externally traverses heat exchanger 36, combustion heat transfers through the tube walls from the combustion gases in the tube interior volumes to the traversing air. That is, heat transfer occurs across walls of the tubes.

Figure 2:
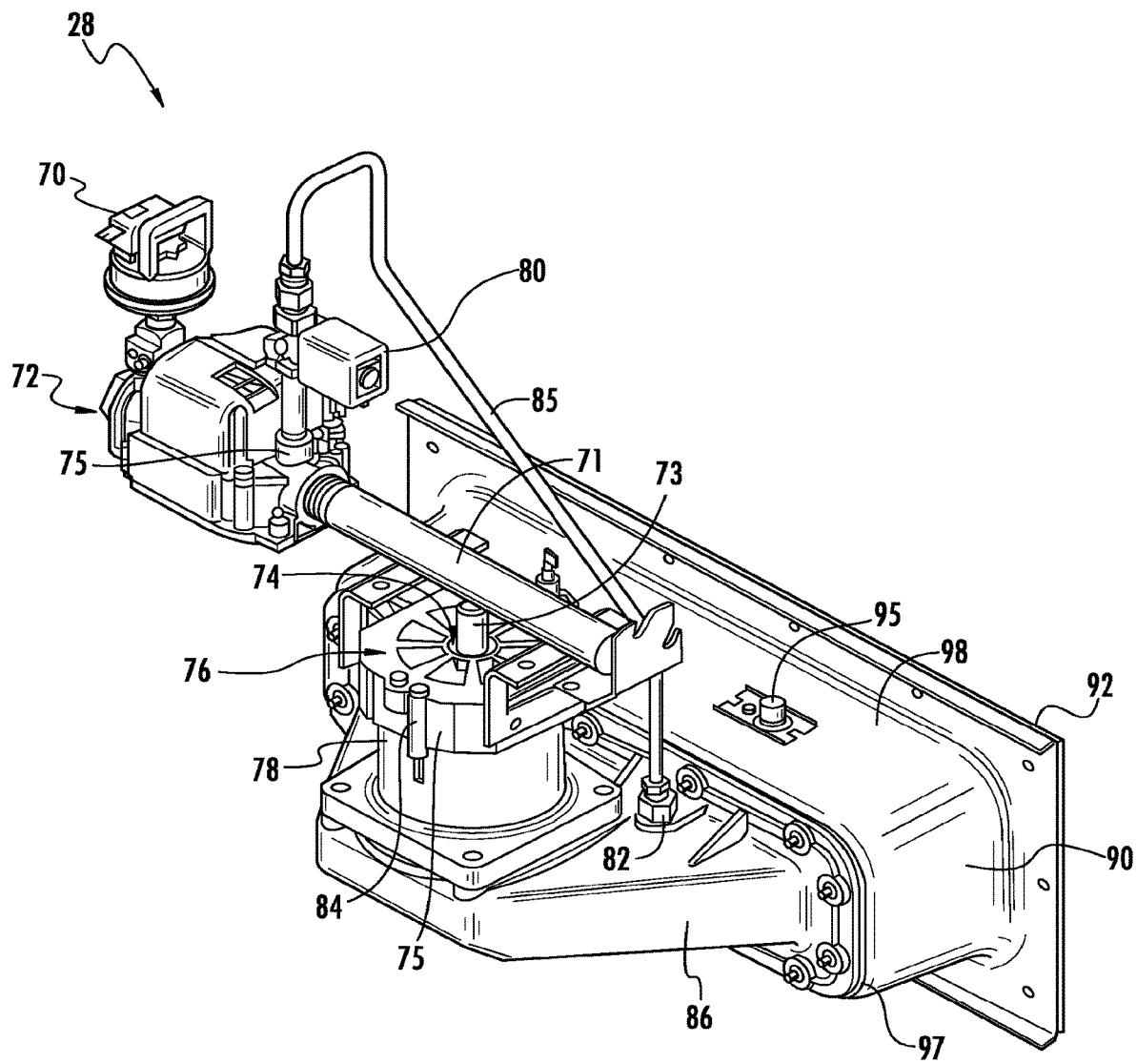
FIG. 2 is a perspective view of an embodiment of the premix burner assembly as shown in FIG. 1.

FIG. 2 is an enlarged perspective view of the premix burner assembly 28 as shown in FIG. 1. The components include, but are not limited to, a low line (supply) gas pressure shutoff switch 70, a gas valve 72, an input gas line (not shown) fluidly connected to an input port of gas valve 72, a gas delivery tube 71 fluidly connected to and extending from an output port of valve 72 and having a gas delivery portion 73 extending from a horizontal portion of tube 71 into a fuel-air mixing chamber 79 (FIG. 3) within a chamber housing 78 via a gas orifice 74, an air diffuser 76 by which ambient air enters chamber 79, a fuel enrichment system (comprising a fuel enrichment solenoid 80, a gas pilot nozzle 82, and a gas conduit 85 therebetween), a flame sensor light-emitting diode (LED) 84, a mixing chamber 86, a gasket 97, a burner box 90, and a plate gasket 92.

Figure 3:
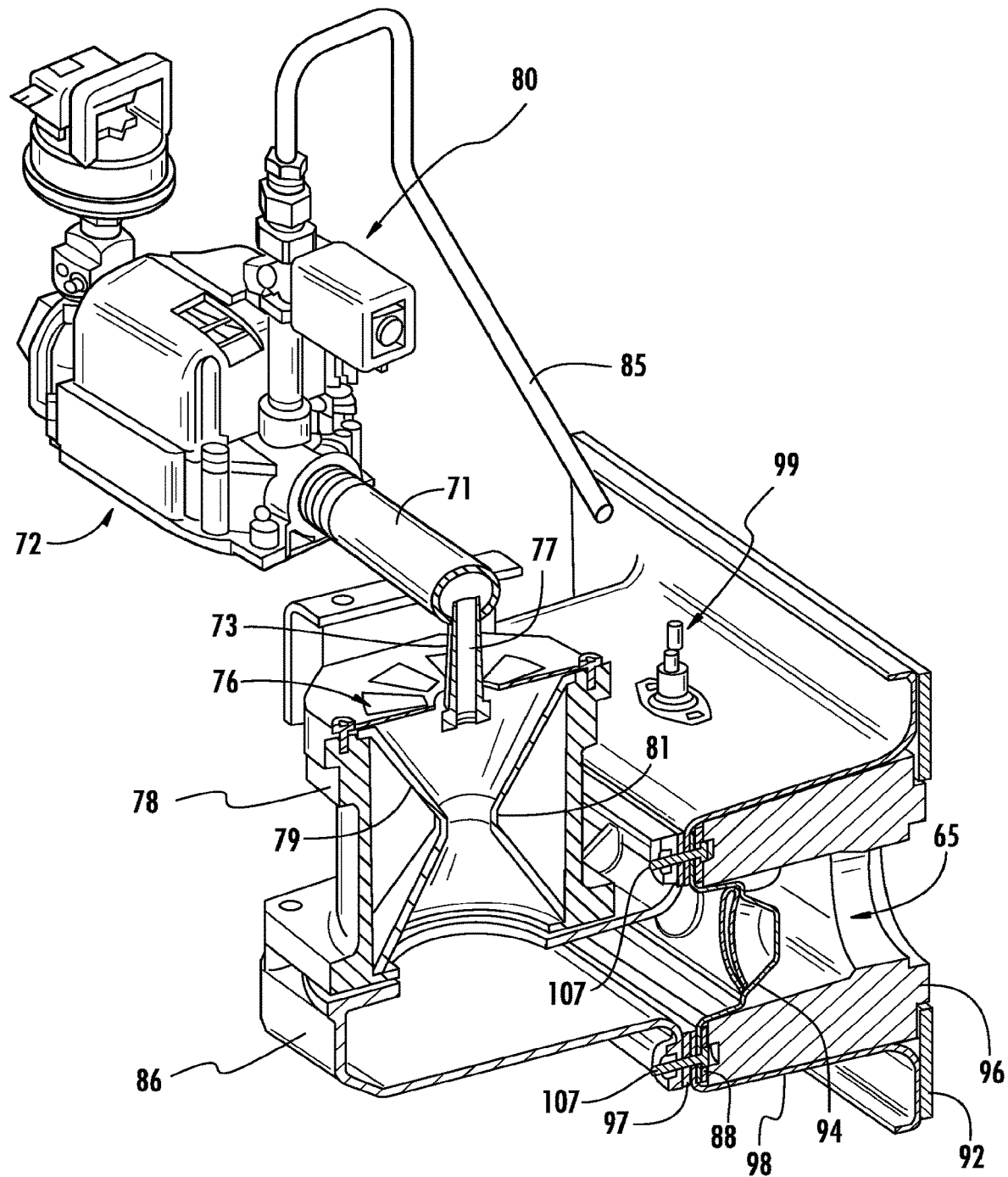
FIG. 3 is a partial sectional perspective view of the premix burner assembly as shown in FIG. 2.

Referring to FIG. 3, the fuel-air mixing chamber in one embodiment is of the Venturi-type. Valve 72 allows gas from the gas supply line (not shown) to pass into gas delivery tube 71 under a pressure controlled by the valve. The tube's gas delivery orifice 73 defines a through-passage 77 having a predetermined cross sectional area/diameter so that, given the pressure of the gas delivered by primary tube 71, the gas exits tube 71 into an upper part of fuel-air mixing chamber 79 at a flow rate that, in conjunction with the negative pressure created by induction draft blower 30 (FIG. 1) presented to mixing chamber 79 through burner box 90 (FIG. 2) and mixing chamber 86, moves the gas flow through a restricted neck portion 81 of chamber 78. The cross-sectional diameter restriction at neck portion 81 increases the speed of the volume of gas and air flowing therethrough, thereby decreasing pressure in the Venturi device and drawing air, which is ambient to burner assembly 28 (FIG. 1) within housing 16 upper part 26 (FIG. 1), into chamber 79 via through-holes that comprise air diffuser 76 and mixing the fuel and air. The configuration of the system between the Venturi device (79) and induction draft blower 30 being known, and the gas flow rate being controllable through the setting of valve 72 and the diameter of gas orifice 73 in view of the gas input line pressure, and the pressure within the Venturi device being known and controllable (through selection of the cross-sectional area of neck portion 81), the mix ratio of air to fuel is otherwise controlled through selection of the negative pressure applied by (which may be described in terms of the "speed" of) induction draft burner blower 30.

An air flow passage may be considered to be defined between an air source (in the illustrated embodiments, the area ambient to the mixing chamber) and the burner. In the premix burner system described herein, the air passage at least partially overlaps the fuel flow passage from the main gas valve. As described below, the combustion area about the burner surface is sealed from the inflow of ambient air except through the fuel flow passage described above. Accordingly, given a structure of the components of the burner assembly discussed above, the air-to-fuel ratio, and the rate at which the air/fuel mixture is drawn to the burner, are defined by the setting of gas valve 72, the speed of induction draft blower 30, the size of Venturi opening 81, and the orifice diameter 73. These parameters, along with the above-described burner assembly structural components, are chosen (e.g. through testing and/or modeling) to achieve a desired level of combustion at the burner surface when the burner and the furnace operates at equilibrium. In particular, the reduction or substantial elimination of secondary (i.e. other than as part of the premix) air inflow to the combustion area about the burner surface means that the air-to-fuel ratio and air/fuel mixture flow rate can be controlled to reduce the amount of air in the combustion chamber beyond that needed for combustion, thereby reducing NOx production as compared to atmospheric-type burners and furnaces. As indicated herein, burner assembly 28 and induction draft blower 30 can be configured and operated so that the furnace emits less than 20 ng/J, though it should also be understood that the particular configuration and operation of these components with regard to the particular air/fuel mixture ratio and flow rate, and the particular air/fuel mixture ratios and flow rates and NOx emission levels, in a given furnace configuration at equilibrium can vary as desired. Moreover the structures of burner assembly 28 for injecting gas and drawing in air can be varied, and the discussion of burner assembly 28 provided herein should be understood to be for purposes of example only.

Immediately below fuel/air mixing chamber 79 is a continuation 86 of the mixing chamber, into which the fuel/air mixture from chamber 79 flows through a hole 87 (FIG. 4) in the top of chamber 86. Although the gas and air are drawn together in chamber 79, they may not thoroughly mix together to provide a consistently mixed fuel. Chamber portion 86 therefore provides a volume within which the fuel and air can so mix, for delivery of a consistent fuel/air mixture to the burner. From the interior volume of chamber 86, the negative pressure applied by induction draft blower 30 draws the fuel/air mixture into the interior volume of a combustion chamber housing 98, which is attached to mixing chamber 86 by a plurality of screws 107 or other suitable devices, with a gasket 97 disposed between the components to seal their connection. Within combustion chamber housing 98 is disposed a burner 94. Burner 94 has a main, thin metal portion 93 that may, in certain embodiments, comprise a mesh, and in the illustrated embodiments comprises a solid mesh sheet defining five spaced apart domes 91 at the end of forwardly-facing frustoconical portions 99 (FIG. 4) so that domes 91 at portions 99 form raised flame-holding structures. As should be understood, in embodiments where the burner has a mesh surface, the edges of the mesh interstices form a flame-holding structure where the mesh is not covered by frame 93.

The burner surface is surrounded by a circumferential flange 101 (FIG. 4) that abuts an inwardly facing flange 103 of housing 98 in the component stack. A gasket 88 abuts the opposing side of flange 101 and sealingly separates flange 101 from a forward face 121 of a refractory 96, for example made of ceramic fiber or other suitable insulating material, which inhibits the loss of heat outward from the combustion chamber interior. Burner main plate 93 and frustoconical portions 99 extend forwardly into the interior volume of refractory 96, which thereby acts as an insulator to the combustion that occurs within the combustion chamber. A plate seal 92 extends radially outward so that it abuts an outer flange 105 of combustion chamber housing 98, and is attached thereto by pins, screws, rivets or the like (not shown) extending through aligned holes in plate seal 92 and flange 105, but extends sufficiently inward to abut a rectangular cutout portion around the periphery of the forward face of refractory 96. An inward portion of the forward face of refractory 96 extends into the inner circumference of plate seal 92 so that the inner portion of the forward face of refractory 96 is flush with the opposing side of plate seal 92. A plurality of screws, bolts, pins, rivets, etc. 107 extend through corresponding holes in flange 101 of burner 94, flange 103 of combustion chamber housing 98, gasket 97, and premix chamber 86 to hold those components together with respect to each other. Refractory 96 defines a plurality of holes in its front face 121 to receive the ends of attachment devices 104 but is not attached to them. Refractory 96 is slidably received in the combustion chamber formed by an interior volume of housing 98 and is held in place by compression between flange 103 and plate seal 92 with screws (not shown) extending through flange 105 and plate seal 92.

As noted, the forward faces of plate seal 92 and refractory 96 form a flush surface. This surface abuts vertical member 20 (FIG. 1), which in this embodiment has a generally planar metal sheet as a primary member. At the section thereof at which the burner assembly attaches to vertical member 20, the main sheet of vertical member 20 defines a pair of through-holes that align with a corresponding pair of through-holes in the front face of refractory 96, one of which is visible in FIG. 3. These holes have diameters comparable to the outer diameters of the two combustion outlet tubes 38, and the forward ends 40 of tubes 38 attach to vertical member 20 at these through-holes so that the interior of combustion chamber 65 is fluidly connected to the interior of combustor tubes 38 through the holes in vertical member 20 and the forward face of refractory 96.

As indicated above, the volume defined by mixing chamber 79/86 (FIGS. 2 and 3) and the components about burner 94 that define combustion chamber 65 (FIG. 3) are fluidly sealed from the area ambient to the premix burner assembly and the input gas line, except for air diffuser 76 (FIGS. 2 and 3). Moreover, plate seal 92 engages vertical member 20 about the through-holes in a fluid sealed manner, and open first ends 40 of tubes 38 (FIG. 1) engage and surround the through-holes in vertical member 20 in a fluid sealed manner, so that the interior of tubes 38 fluidly connect with combustion chamber 65 without the influx of ambient air into the combustion chamber or the tubes. Also, tubes 38 sealingly connect to manifold 46. Manifold 46 sealingly connects to tubes 52. Tubes 52 sealingly connect to manifold 51, and 51 sealingly connects to the input side of induction draft blower 30. Accordingly, the negative pressure created at the input of blower 30 and within manifold 51 is translated through tubes 52, manifold 46, and tubes 38 to combustion chamber 65 without drawing ambient air (other than through air diffuser 76) into the combustion chamber or into the combustion exhaust gas flow up to blower 30.

Figure 4:
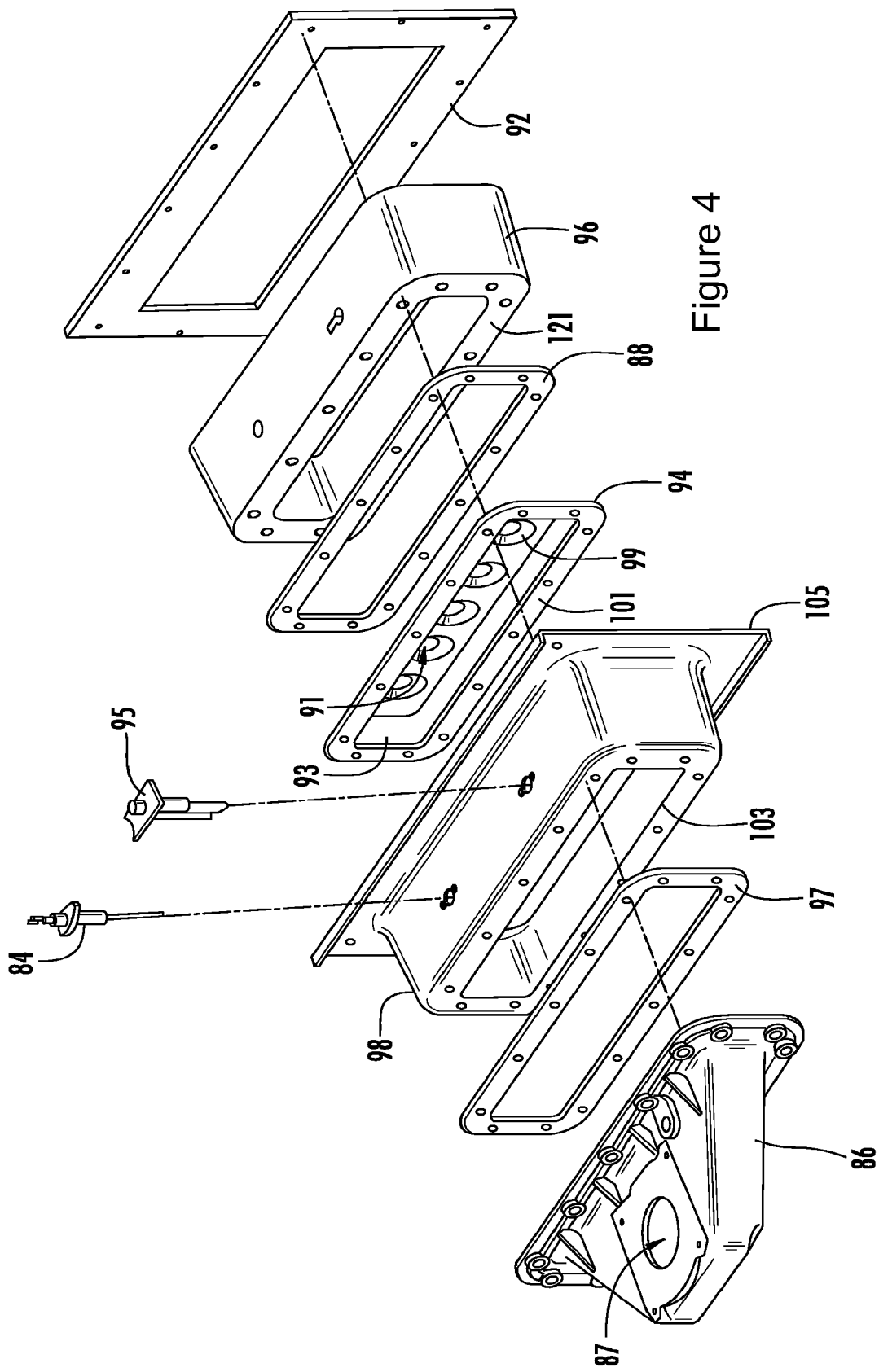
FIG. 4 is an exploded view of components of the NOx premix burner assembly as shown in FIG. 1.

Referring also to FIGS. 2 and 4, extending through corresponding holes in the top of combustion chamber housing 98 are a flame sensor and spark igniter 95. Spark igniter 95 is operatively connected to controller 21 via conductive wiring and a power source so that actuation of igniter 95 by the controller causes the igniter to create a spark at its lower distal end, which extends down into the interior of the combustion chamber in front of and adjacent to main portion 93 and one of domes 91 of burner 94 and the output of an end 83 (FIG. 5) of gas nozzle 82 of the fuel enrichment system extending into the combustion chamber from the hole in the chamber wall, as discussed below. When controller 21 actuates induction draft blower 30 (at an initial speed lower than its equilibrium speed) to thereby provide negative pressure to combustion chamber 65 via tubes 38 and 52 and controls valve 80 to open, air flows into area 65 in response to the negative pressure. The controller also actuates igniter 95, thereby causing a spark at the burner surface that ignites the fuel from the fuel enrichment system, which is now flowing from the nozzle proximate the burner and which mixes with air initially present in the combustion chamber and drawn by the blower, causing a flame to hold at the nozzle, proximate the burner surface. As discussed below, the controller then controls valve 72 to open gas flow into mixing chamber 79/86 and from there to burner 94, at which the fuel enrichment system flame ignites the new premix air/gas mixture. The combustion of the premix air/fuel mixture continues through the warm up period. Further as a result of the negative pressure created by blower 30, hot gas generated by the combustion at burner 94 is drawn out of the combustion chamber through the holes in the forward face of refractory 96 and through vertical member 20 and into and through tubes 38 and 52 to blower 30, through intervening manifolds 46 and 51.

Induction draft blower 30 is a variable speed blower that operates in response to controller 21 (FIG. 1), which sends control signals to the blower to operate at predetermined speed levels that vary incrementally over the blower's overall speed range. Controller 21, in turn, responds to two pressure switches/sensors 55 and 57 (shown schematically in FIG. 1) located within the interior volume of manifold 51 at positions (vestibules) near one or more openings of manifold 51 to respective tubes 48 in order to thereby detect the pressure of the draw that blower 30 applies to the heat exchanger tubes. The sensors are configured to change state, e.g. to close so that the sensor completes an electrical circuit causing an output line from the sensor to controller 21 to change state, upon occurrence of respective different pressures—sensor 55 at a pressure close to but just below zero gauge and sensor 57 at a more negative predetermined pressure at which the interior of manifold 51 is desired to exist for the furnace's normal, steady-state operation.

Figure 5:
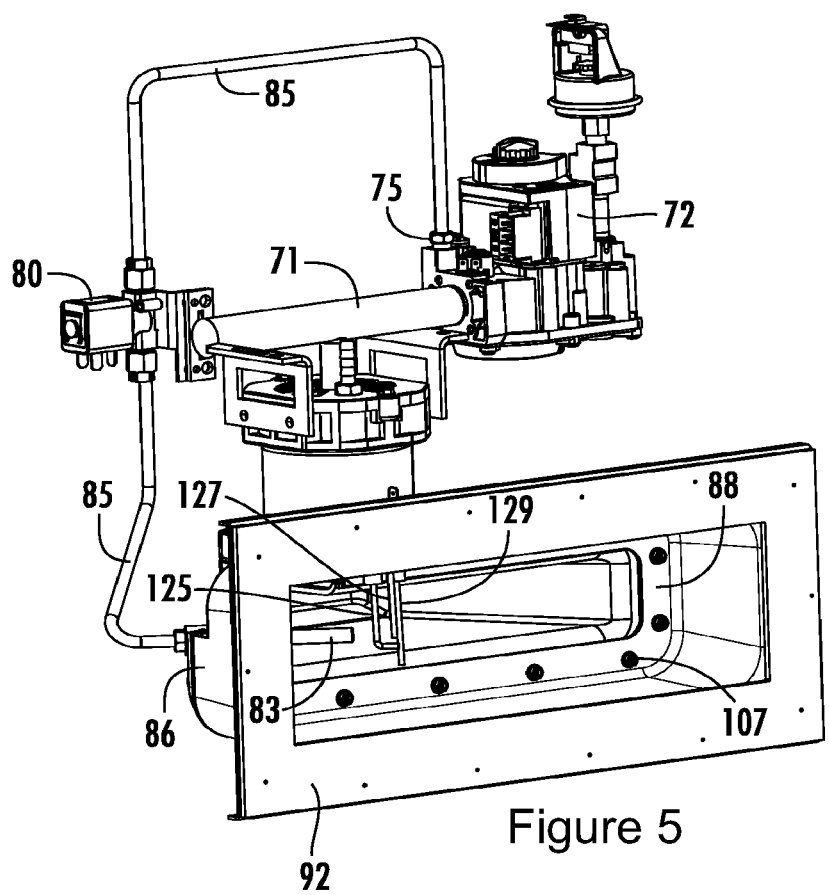
FIG. 5 is a partial perspective view of an embodiment of the premix burner assembly as shown in FIG. 1.
Figure 6:
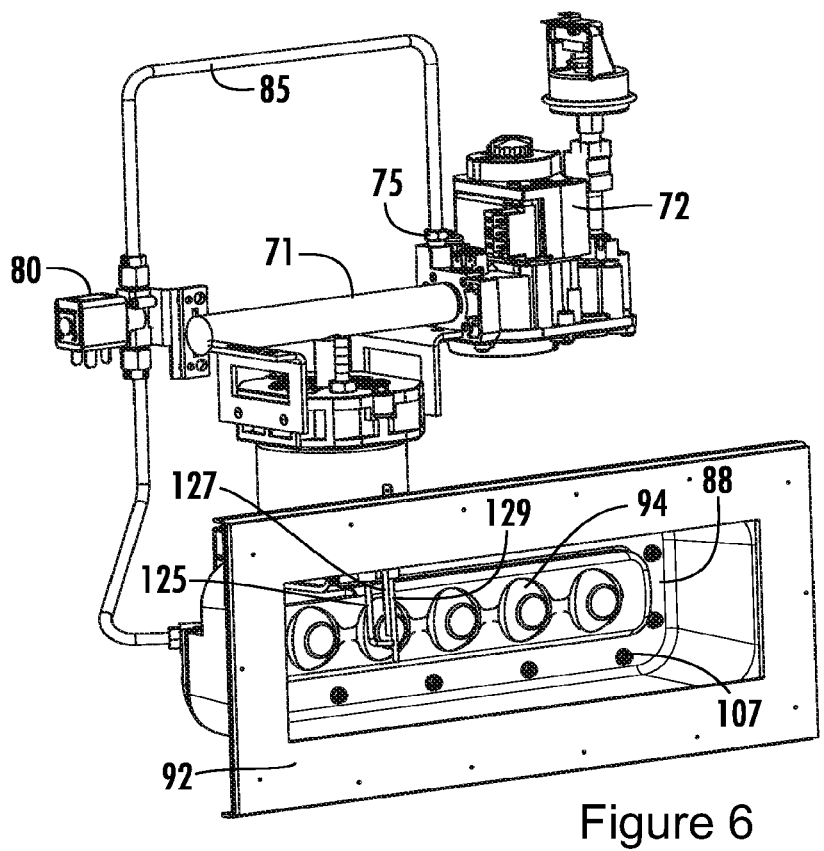
FIG. 6 is a partial perspective view of the premix burner assembly as in FIG. 5, with a burner.
Figure 7:
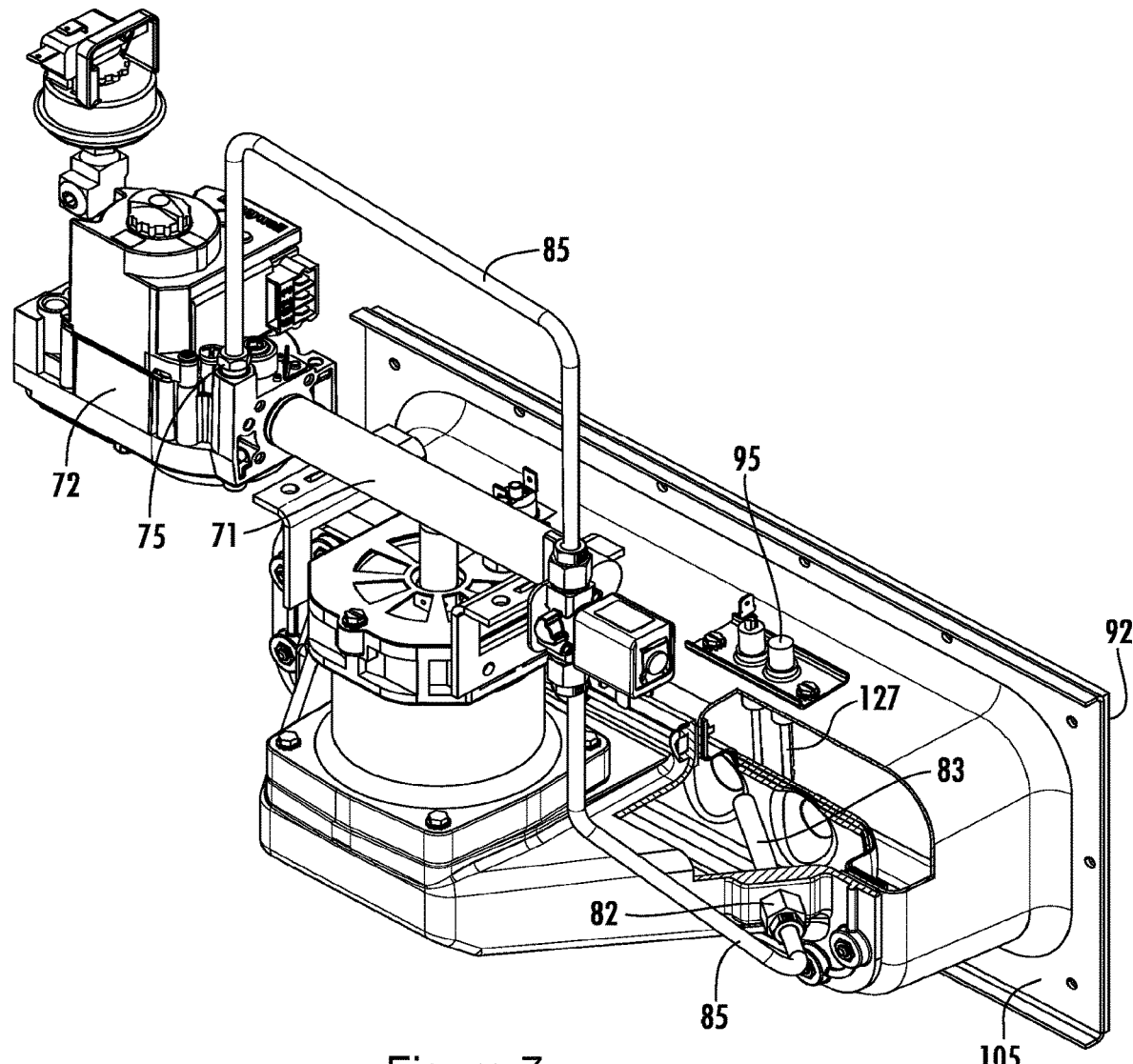
FIG. 7 is a partial, sectional view of the premix burner assembly as in FIG. 5.

FIGS. 2-4 illustrate a first embodiment of a premix burner system in accordance with the system illustrated in FIG. 1. FIGS. 5-7 illustrate a second embodiment of such a premix burner system. The two embodiments differ in the inclusion/exclusion of a pilot valve and resulting methods of operation of valves 72 and 80 and the position at which the gas conduit connects to chamber 86. The discussion below refers initially to the embodiment of a fuel enrichment system as in FIGS. 5-7. Unless specifically described or illustrated otherwise, the components of the embodiment of FIGS. 2 and 3 are the same as those of the embodiment of FIGS. 5-7. It should be understood that if corresponding components of one embodiment are not visible in the Figures of the other embodiment, such components are nonetheless present.

The fuel enrichment system is comprised of fuel enrichment solenoid 80, a first fitting (in this instance, a flare nut) 75 that secures conduit 85 in fluid communication with the pilot gas passage output port from valve 72, fuel conduit 85, and a gas pilot nozzle 82 (FIG. 7) that is secured to conduit 85 by a flare nut and that extends through a through-hole through the wall of mixing chamber 86, thereby fluidly connecting conduit 85 and chamber 86. Gas pilot nozzle 82 is disposed within chamber 86 and is attached to conduit 85 so that conduit 85 and nozzle end 83 are in fluid communication so that conduit 85 delivers its gas flow to the nozzle.

In some embodiments, the fuel enrichment system is used to inject raw fuel (i.e. fuel not mixed with air) from gas nozzle end 83 to the burner surface immediately at start up. In operation, and with respect to the embodiment of the burner system illustrated at FIGS. 5-7, controller 21 (which may comprise a processor and computer program instructions stored in memory at or remotely from the processor) may receive, when furnace 10 (FIG. 1) is inactive, a temperature signal from thermostat 23 (FIG. 1) or other temperature sensor in the conditioned space indicating the need to provide heated air to the conditioned space and, therefore, that controller 21 should activate furnace 10. The signal may be, for example, a raw temperature signal from a temperature sensor in the thermostat that controller 21 compares to a threshold (or "set point") temperature of the conditioned space at which the furnace should be activated, or it may be, in another example, a direct instruction from the thermostat based on the thermostat's comparison of a temperature measurement to a set point. In response to receipt of the signal, the executable computer program instructions executed by controller 21 cause controller 21 to send a signal to a motor controller that controls an electric motor that turns a fan rotor in blower 30, that causes the motor controller to operate blower 30, from an initial cold start, to a first speed that is slightly below its normal (post warm-up, or steady state) operating speed. The control of the induction blower to this initial cold start speed can be effected by controller 21 in a continuously varying or stepped manner. Controller 21 does not yet activate air handler blower 56 (FIG. 1). This avoids blowing initially cold air into the conditioned space and allows the heat exchanger to warm up more quickly than it otherwise would if the air handler were to move air from the conditioned space over the heat exchanger. The controller maintains induction blower 30 at this initial cold-start speed for about twenty-five seconds, to thereby draw clean air into the burner system so that the burner ignition system, discussed below, starts from that predetermined condition.

At the end of the twenty-five second period, controller 21, again in a continuously varying or stepped varying manner, slows the induction blower speed from the cold start speed to a predetermined initial target speed calibrated to draw air to the burner surface at a flow rate that is lower than the air flow rate the blower draws at equilibrium. The flow rate of gas from fuel enrichment system nozzle end 83 (FIG. 5) is lower (about 7000 Btu) than that of the main gas valve. The initial low blower speed provides sufficient air to the burner (at which combustion of the raw fuel provided by nozzle end 83, mixed with this air, occurs) to allow combustion of a fuel-air mixture to occur. Also, the lower blower speed (relative to steady state speed) draws a lesser amount of air to the burner (when main gas valve 72 is opened) than when the induction blower's higher steady state speed draws a greater flow to mix with the main gas flow, such that the blower speed at ignition results in an air/fuel ratio at the burner area that is fuel-richer than the burner assembly's air/fuel ratio at steady state and at a flow rate higher than at steady state operation of the system and the blower. The initial fuel-rich condition enables the individual flames at the burner surface to stabilize more quickly, thereby reducing associated pressure pulses and noise. The lower induction blower speed is considered the initial target speed, without consideration of the twenty-five second purge period speed, because this is the speed at which burner ignition occurs.

Testing of the system, given the initial target speed to which blower 30 is controlled, determines a pressure within manifold 51 needed to provide sufficient air flow to mix with the gas from nozzle end 83 so that ignition and flame stabilization is likely to occur. Pressure sensor 55 is configured to change state at this predetermined pressure. Upon activating the blower motor controller to the initial target speed, controller 21 receives and monitors a signal from sensor 55 (indicating the sensor's state) and, when pressure sensor 55 closes (i.e. when the predetermined negative pressure is reached), thereby indicating that the air flow to the area proximate nozzle end 83 and the burner surface is sufficient to support stable ignition, and at least ten seconds have passed, the program instructions cause controller 21 to open a solenoid pilot valve (not shown) within main valve 72. The solenoid valve, i.e. a pilot valve, is configured with respect to the main flow valve of valve 72 so that the main valve can be open or closed if the pilot valve is open but is forced closed when the pilot valve is closed. The main valve and pilot valve are both housed in housing 27 of valve 72. The construction and operation of pilot and piloted valves in gas valves should be understood and is therefore not discussed in further detail herein. Gas flow through the solenoid pilot valve flows to gas line 85 and, thereby to valve 80. Controller 21 is in operative communication with both the pilot valve and the main gas valve, as it is with valve 80, so that the controller can actuate each valve between its respective open and closed states.

As should be understood, gas flow through the pilot valve passage (which is part of a gas flow passage between a gas source, i.e. the input gas line, and the burner) is independent of the main gas flow passage (which is also part of a gas flow passage between a gas source, in this case also the input gas line, and the burner) through valve 72 (i.e. the flow that outputs to tube 71). The signal from controller 21 to the pilot valve causes the pilot valve to open, thereby allowing gas to flow under pressure from the input gas line through the pilot valve passage and pilot valve, and conduit 85 to valve 80. When valve 80 opens, gas further flows to gas pilot nozzle 82 and its nozzle end 83.

As referred herein, "actuation" of a given valve may refer to mechanical and/or electrical movement of the valve to one state and another, or may refer to actively maintaining the valve in one state or another, or, if the valve is such that it maintains itself in a state without requiring an active signal or bias, allowing the valve to remain in that state. Also, while the present discussion may refer to a valve being in a state that allows fluid flow through the valve and a passage in which the valve is disposed, it should be understood that this does not necessarily mean fluid actually flows through the valve, as there may be other valves or control devices in the flow passage that may prevent actual flow, independently of the valve.

At the time controller 21 receives the thermostat signal requesting activation of the furnace, the controller does not receive a flame sensor signal indicating presence of a flame at pilot nozzle end 83. This, in turn, under the algorithm conducted by the program instructions executed by controller 21, prevents the controller from opening the main gas valve in valve 72 that provides gas flow to tube 71. The controller does, however, attempt to activate the pilot flame, and it is in this attempt that controller 21 opens both the pilot valve and solenoid valve 80. Further in this regard, controller 21 is also in operative communication with igniter 95, in particular controlling the application of electric current from a current source to the igniter to cause actuation of a spark at a gap between igniter elements 125 and 127. The output of nozzle 83 is oriented to direct the gas flow from the nozzle, which is disposed on the other side of the wire mesh of burner 94 from the igniter elements, through the burner mesh and toward the igniter element gap. Controller 21 has actuated blower 30 to its initial target speed, as discussed above, causing the blower to draw air through air diffuser 76 and mixing chamber 86 and through burner 94 to igniter 95 before flowing through the heat exchanger to the blower. This air mixes with the gas flow from gas nozzle end 83, thereby allowing the spark created by igniter 95 to ignite the mixture and causing a flame to be supported by the flow from the nozzle output end. A flame sensor element 129 detects the flame and reports a corresponding signal back to controller 21.

At the time when controller 21 opens the solenoid pilot valve, solenoid valve 80 remains closed, but at about one second after opening solenoid pilot valve, the program instructions cause controller 21 to also open solenoid valve 80, thereby causing unmixed gas to flow from nozzle end 83 into the combustion chamber. Controller 21 simultaneously sends a control signal to igniter 95, thereby causing a spark that ignites the fuel enrichment system fuel that mixes with the air drawn to the combustion chamber by the blower. Controller 21 monitors the output of a flame sensor proximate the igniter. If no flame is detected, the controller repeats actuation of the igniter until a flame is detected or until a predetermined number of failed attempts. Upon detecting a flame at nozzle end 83 that remains detected for at least ten seconds, controller 21 actuates the main gas flow valve at 72 and sends a control signal to the motor controller of blower 30 to increase the blower speed in a continuously varying or continuously incremental manner toward a target speed over a period of about 120 seconds. The air flow drawn by the induction blower mixes with the main gas flow, and the resulting air/fuel mixture is drawn to the burner surface, so that the fuel enrichment system flame at nozzle end 83 ignites the main flow. As long as controller 21 detects a flame from the flame sensor during this process, the controller maintains the main gas flow and the fuel enrichment gas flow simultaneously open for a period of time (e.g. about four seconds) sufficient for the fuel enrichment flame to ignite the main air/fuel mix at the burner, and then closes gas valve 80 to disable the fuel enrichment gas flow and thereby extinguish the flame at nozzle end 83.

In other embodiments, e.g. where there is no fuel enrichment system, controller 21 again initiates blower 30 to an initial speed (which may follow a purge speed, as above) and monitors the output of sensor 55 as described above. When the sensor changes state, indicating that the air flow is at a state that will support stable ignition of the main air/fuel mix, controller 21 actuates the main gas valve at 72 to thereby allow the gas flow to mix with the air flow being directed by the draw from blower 30 to the burner surface.

Because the blower speed at the ignition stage is lower than its steady state speed, but the gas flow rate is the same as at steady state, the air/fuel ratio at start up is fuel-richer than at steady state. Also upon the state change of sensor 55, controller 21 sends a signal to actuate igniter 95, so that the igniter causes ignition of the fuel-rich air/gas mixture at the burner.

In either embodiment, controller 21, upon detection of the state change of sensor 55 and as noted above, modifies the control signal it sends to the blower motor controller so that the target speed defined by the control signal increases in stepped increments from the initial, ignition target speed. Correspondingly, the pressure within manifold 51 drops at a continuous, stepped rate from a pressure corresponding to the initial blower speed at ignition, so that the flow rate of combustion gas through the heat exchanger varies with the blower speed, and so that the target blower speeds discussed herein can be considered to correspond to target exhaust gas flow rates. Simultaneously, the program instructions executed by controller 21 cause the controller to receive and monitor the output signal from pressure sensor 57, which is configured to change state when it detects pressure at or below a predetermined negative pressure at the vestibule(s) of manifold 51 that is desired during the furnace's operation at steady-state, i.e. after a period from initial ignition of an air/gas mix upon the state change of sensor 55 to the state change of sensor 57, when the furnace is in its normal operation. When sensor 57 changes state, controller 21 detects the sensor's state change and, in response, modifies the control signal to the blower motor controller to increase a blower speed slightly further (to thereby maintain the manifold pressure sufficiently below the trigger level of sensor 57 to prevent bounces in the sensor's state) and than stops the steady increase in blower target speed and continues to drive the blower at this final speed, i.e. at the speed at which the blower is to be operated when the furnace is in steady state. That is, the ramp-up in blower speed and combustion gas flow rate, and corresponding ramp-down in pressure in the heat exchanger and at the burner, continues from the state change of sensor 55 until a desired steady-state pressure within the closed heat exchanger and combustion chamber is achieved at the state change of sensor 57. In the presently-described embodiments, this ramp-up in speed occurs over an about 120 second period, but it should be understood that the system can be designed for other ramp-up time periods. At this point, the controller maintains the blower target speed at the speed at which the predetermined pressure occurs for the remainder of the time the controller maintains the furnace in an active state until the controller receives a signal from thermostat 23 to deactivate the furnace (e.g. because a temperature sensor at the thermostat provides a signal to the thermostat controller indicating that the temperature in the conditioned space has reached or exceeded an upper threshold or set point). Thereafter, upon receiving a subsequent temperature signal from thermostat 23 to activate the furnace, if more than ten minutes after shut off, the furnace is considered to be at a cold start condition, and the program instructions executed by controller 21 cause the controller to again execute the above-described steps.

Because controller 21 brings blower 30 up to its steady-state target speed gradually, rather than by sending the blower a signal immediately from a cold start that drives the blower to its steady-state target speed (i.e. the blower's speed during the furnace's normal operation), the system delivers the fuel/air mixture to the burner following start up at a lower flow rate than it otherwise would. As used herein, the "target" speed is the speed to which the control signal from controller 21 directs the blower to operate, rather than the blower's actual speed, which will be understood to sometimes lag or otherwise slightly vary from the target speed. This has the effect of increasing the temperature in the combustion chamber (and the temperature of gases in flue pipe 12) more gradually than would occur if the blower were immediately driven to its target steady-state speed. The reduction in the rate of change in temperature about the burner correspondingly reduces the severity of pressure pulses in the combustion chamber caused by the temperature change, thereby reducing noise created by those pressure pulses as compared to the noise that may otherwise be created when the blower is immediately driven to its target steady state speed from a cold start. Also as a result, the time needed for flue gas exiting blower 30 into flue pipe 12 to reach its steady-state temperature (i.e. the furnace's warm up time) also increases. In the presently-illustrated embodiments, e.g. the warm-up period would generally be expected to be around a few seconds if blower 30 were immediately driven to its steady-state speed from a cold start condition, whereas in embodiments described herein in which the controller controls the blower speed to change in a continuous, stepped ramp up to the target steady-state speed, the furnace's warm-up period (before the flue pipe temperature reaches equilibrium) increases by approximately ninety (90) seconds from what the warm-up period would be if the blower were driven immediately to its steady state speed upon ignition of the air/fuel mix, and which may be several minutes. Thus, for example, the programming instructions executed by the controller cause the controller to output a control signal to the blower motor controller that ramps up the target blower speed so that the target blower speed and, correspondingly, the combustion gas flow rate reach their target steady-state speed and flow rate only after the temperature of the flue gases immediately following, or immediately adjacent to, the blower output reaches a relatively high proportion, e.g. about 90%, of its steady-state temperature. Still further, the controller's control system in certain embodiments ramps up the target blower speed and combustion gas flow rate so that the target blower speed and combustion gas flow rate reach the target steady state speed and flow rate only after the temperature of the flue gases immediately following, or immediately adjacent to, the blower output reaches and passes the dew point, although in other embodiments the target blower speed is reached before the flue gas reaches the dew point.

Accordingly, it will be understood that the ramp-up in motor speed and combustion gas flow rate, and corresponding ramp-down in pressure at the burner and in the heat exchanger, occurs generally simultaneously with the furnace's warm-up period, i.e. when the temperature of exhaust gas output from blower 30 into the flue change from an initial level at the furnace's cold start to a steady-state or equilibrium level, but that these events do not necessarily conclude at the same time. That is, if the warm up period is considered to be the period from cold start to a point at which the exhaust gas in the output flue reach a steady-state temperature over the furnace's operation, the ramp up in the speed of blower 30 also begins following the cold start, and is therefore coincident with the warm-up period, but it is not necessarily true that the blower speed will reach its steady state level at the same moment the flue exhaust gas reaches its steady state temperature. Nonetheless, the blower's ramp up in speed is considered to occur during the furnace's warm-up period.

In certain embodiments, controller 21 controls the ramp up in speed of blower 30 in response to a temperature sensor within or on the surface of flue pipe 12, and in such embodiment, the ramp up in speed of blower 30 runs until the temperature sensor detects that the gas in flue pipe 12 has reached a temperature (which may be determined through system testing) at a certain percentage, e.g. about 90%, of the flue gas equilibrium temperature, at which point controller 21 stops the speed ramp up and maintains the blower at the speed corresponding to the flue gas steady state temperature.

Although in the presently-illustrated embodiments the blower is disposed to pull the combustion gas from the burner through the heat exchanger, it should be understood that the blower may be disposed upstream from the main gas valve, pushing air into the mixing chamber so that the air/fuel mixture is pushed to and through the burner, the heat exchanger, and the flue. In such embodiments, the blower speed may also be controlled in a manner as described above to slow the blower's transition from cold start to a steady state speed.

While the example above has been described in terms of a continuously-stepped, i.e. incremental, increase in motor speed during furnace warm up, this should be understood to be for purposes of example only and that the present disclosure encompasses a continuously-varying ramp up in blower speed.

As should be understood, regulatory requirements relating to the ignition of a gas-fired furnace may require that an unlit gas flow may flow into the combustion chamber for no more than a certain period of time (e.g. approximately ten seconds) within which the gas/air mixture must be lit or, otherwise, the gas flow must be discontinued. Where the system is configured to ignite the main premix gas/air mixture by igniter 95, rather than by a pilot flame, ignition of the larger premix fuel/air mixture after more than one attempt by the igniter within the allowed time, and corresponding collection of fuel in the combustion chamber, may cause a loud ignition. In the presently-described embodiment of FIGS. 5-7, however, the initial fuel flow is of the pilot valve flow from nozzle end 83. Because the pilot valve gas flow is smaller by volume than the premix burner flow, the ignition of that flow after multiple attempts results in a lower noise level than the ignition of the premix fuel/air mixture. Moreover, when controller 21 opens the main gas valve of valve 72 following receipt of the signal from flame sensor element 127 indicating that the fuel enrichment flow has ignited, the resulting flow of the premix gas/air mixture ignites immediately due to the existence of the flame at nozzle 83. This avoids the accumulation of gas and air prior to ignition that could occur if the initial ignition were of the premix gas/air mixture and, thereby, lowers the noise accompanying ignition of the premix flow.

When controller 21, which as should be understood may include relays and other components appropriate to perform the functions as disclosed herein, opens the main gas valve, the controller waits a short, predetermined period of time that is sufficient for the flame at nozzle 83 to ignite the premix gas/air mixture flow, and closes solenoid valve 80. This discontinues the flow of gas from nozzle end 83, but because the premix flow is now burning, flame sensor 127 continues to detect a flame and send a corresponding signal back to controller 21. The algorithm embodied by the program instructions executed by controller 21 requires that the signal from flame sensor 127 indicate presence of a flame for the controller to maintain the main gas valve of valve 72 in an open state. Thus, as long as the flow remains lit, and detector 127 detects the flame, controller 21 maintains the main gas valve in an open state, until the algorithm determines that combustion at the furnace should cease, e.g. due to comparison with temperature set points or as a result of a timing feature in the algorithm. During this time when the controller maintains the main gas valve at 72 in an open state, the controller must also maintain the pilot valve within valve 72 in an open state. Because the pilot valve and the main valve within valve 72 are configured with respect each other so that the pilot valve must be open in order for the main valve to be open, the pilot valve must remain open during the actuation of valve 72 to provide the premix fuel flow to the burner. Accordingly, solenoid valve 80, operatively disposed in the gas flow in conduit 85 between the pilot valve and the nozzle, is used to close the gas flow to the nozzle following the premix flow ignition.

Unlike the embodiment of FIGS. 5-7, main valve 72 of the embodiment of FIGS. 2 and 3 does not have a pilot valve. A portion of the gas from the gas input line is diverted within main valve 72 to the input side of valve 80, so that the valve 80 input always sees pressurized gas. In an alternative embodiment, pressurized gas is provided from valve 72 to the input of valve 80 only when main valve 72 is opened. In the presently-described embodiment, either arrangement is effective because valves 72 and 80 open simultaneously. In this embodiment, upon receiving the signal indicating the need to actuate the furnace, initiating blower 30 (FIG. 1), and detecting a signal from sensor 55 (FIG. 1) indicating sufficient negative pressure exists at the burner to ignite and stabilize a flame, controller 21 simultaneously opens main gas valve 72 and fuel enrichment valve 80 and immediately begins attempts to ignite the combination of the main air/gas flow and the fuel enrichment flow by igniter 95. Following ignition, the controller waits a predetermined period of time before closing fuel enrichment valve 80. As a result, the fuel enrichment system injects un-mixed gas into the premix flow as it reaches the burner surface, thereby making the mixture richer in fuel at start up than it would otherwise be. This increases the likelihood of a quick ignition and causes the resulting flame to more quickly stabilize once ignition occurs. The predetermined time between ignition and the closing of fuel enrichment valve 80 should be a period of time sufficient to allow ignition utilizing the fuel enriched mixture and for flame stabilization to occur, given the particular configuration of the burner, and can be determined through testing.

In operation of the embodiment of FIGS. 2 and 3, and as noted above, when furnace 10 is inactive, furnace system controller 21 (FIG. 1) may receive a signal from thermostat 23 (FIG. 1) or other temperature sensor in the conditioned space indicating the need to actuate the furnace to provide heated air to the conditioned space. Upon receiving the signal, controller 21 sends a signal to the motor controller of blower 30 (FIG. 1) to actuate the blower to an initial target speed that may be higher than the initial target speed at which the blower is actuated with the fuel enrichment system of FIGS. 5-7, in that the blower needs to draw the premix fuel/air mixture to the blower at initial ignition. The particular speed may be determined through testing, in order to determine the blower speed that results in an enriched fuel/air mixture (as compared to the mixture ratio in steady state) desired for a stable initial ignition. Similar to the embodiment of FIGS. 5-7, testing of the system, given this initial target speed to which blower 30 is controlled, determines a pressure within manifold 51 (FIG. 1) needed to provide sufficient air flow to the mix with the gas from the main gas line/valve 72 and the raw gas feed from nozzle end 83 so that ignition and flame stabilization is likely to occur. Pressure sensor 55 (FIG. 1) is configured to change state at this predetermined pressure. Accordingly, upon activating the blower motor controller to the initial speed, controller 21 receives and monitors a signal from sensor 55 and, when pressure sensor 55 changes state, thereby indicating that the air flow to the area proximate the burner surface is sufficient to support stable ignition, the controller's program instructions cause controller 21 to open both main valve 72 and solenoid valve 80, thereby causing the blower to draw the premixed fuel/air mixture to the burner surface and the nozzle end 83 to direct unmixed fuel to the burner surface. Simultaneously, the controller actuates igniter 95, causing a spark that ignites the premix/raw fuel mixture. Controller 21 monitors the output of a flame sensor proximate the igniter. If no flame is detected, the controller repeats actuation of the igniter until a flame is detected or until a predetermined number of failed attempts. Upon detecting a flame, controller 21 sends a control signal to the motor controller of blower 30 to increase the blower speed in the continuously varying or continuously incremental manner toward a target speed over a warm up period, as discussed above with respect to the embodiment of FIGS. 5-7. As long as controller 21 detects a flame from the flame sensor during this process, the controller maintains the main gas flow and the fuel enrichment gas flow simultaneously open for the predetermined period of time and then closes gas valve 80 to disable the fuel enrichment gas flow.

This discontinues the flow of gas from nozzle end 83, but because the premix flow is burning, flame sensor 127 continues to detect a flame and send a corresponding signal back to controller 21. The algorithm embodied by the program instructions executed by controller 21 requires that the signal from flame sensor 127 indicate presence of a flame for the controller to maintain the main gas valve of valve 72 in an open state. Thus, as long as the flow remains lit, and detector 127 detects the flame, controller 21 maintains the main gas valve in an open state, until the algorithm determines that combustion at the furnace should cease, e.g. due to comparison with temperature set points or as a result of a timing feature in the algorithm. Because main valve 72 has no pilot valve, there is no requirement for a pilot valve to remain open in order to maintain main valve 72 open. Nonetheless, valve 80 is still needed in this embodiment to control flow of the fuel enrichment gas flow to the combustion area, and valve 80 is used to close the gas flow to nozzle 82 following the premix flow ignition.

As noted above, upon activation of burner system 28 from a cold start, controller 21 controls the furnace system to operate through a warm up period, in which the temperature within combustion chamber 65 and the temperature within exhaust flue pipe 12 at the output of induction draft blower 30 increase from their initial levels to their steady-state levels when the furnace is in its normal operating level. Because all paths into combustion area 65 (considered when blower 30 is operating), except for air diffuser 76, are sealed, the only source of air to the burner is through the air diffuser. Because the level of combustion at the burner is directly related to the length of time needed for the furnace to reach the steady-state temperature, and the availability of air at the burner is directly related to the level of combustion, the flow rate of the air/fuel mixture from the mixing chamber to the burner is directly related to the level of combustion at the burner and, therefore, the length of time needed for the furnace to reach its steady-state temperatures, i.e. the warm up period. Because the speed of blower 30 determines the flow rate of air (above the amount that might occur due just to the gas flow from the pressurized gas line) through air diffuser 76 and the resulting air/fuel mixture carried to the burner, the length of the warm up period is directly related to the time period over which the controller drives induction draft blower 30 from an inactive state or other starting speed up to its steady-state speed.

In the presently described embodiments, when controller 21 (FIG. 1) is controlling blowers 30 and 56 and gas valves 72 and 80 to be in closed/inactive states and receives a signal from thermostat 23 (FIG. 1) requesting that controller 21 actuate the furnace, controller 21 does not immediately send control signals to the motor controller of blower 30 to drive blower 30 to its steady-state speed. Instead, and as discussed above, controller 21 controls the speed of blower 30 up to its steady-state speed over a continuously varying or incremental target speed change from start to steady-state, thereby lengthening the warm up period from what it would be if the controller were to have controlled the speed of blower 30 to its steady-state speed immediately. As a result, the pressure pulses in combustion chamber 65 around the stabilizing flames, and the formed flames during the temperature transition in the combustion chamber through the warm up period, are lessened in severity, thereby reducing vibrations in the burner and the fluid disturbances in the combustion chamber that can cause noise. The length of the warm up may be bounded by operation parameters. ANSI standard Z2147, for example, calls for non-condensing furnaces to reach the dew point in the flue pipe in at most two minutes from start up. Thus, in the presently-described embodiments conforming to ANSI Z2147, the rate at which controller 21 ramps up the speed of blower 30 is chosen (e.g. through trial and error testing) so that the temperature in exhaust flue 12 immediately following the output port of blower 30 reaches the dew point within the time required by the standard.

Accordingly, in view of the present disclosure, it will be understood that the particular length of the warm up period can vary as desired within a particular system to accommodate structural differences from one embodiment to the next and to accommodate various parameters, for example the length of time to dew point and the amount of noise generated at the burner, as desired. In the presently described embodiments, the ramp up speed at which controller 21 controls the operation of blower 30 is selected for a resulting warm up period of approximately ninety seconds, but it should be understood that the warm up period may be varied as desired.

Figure 8:
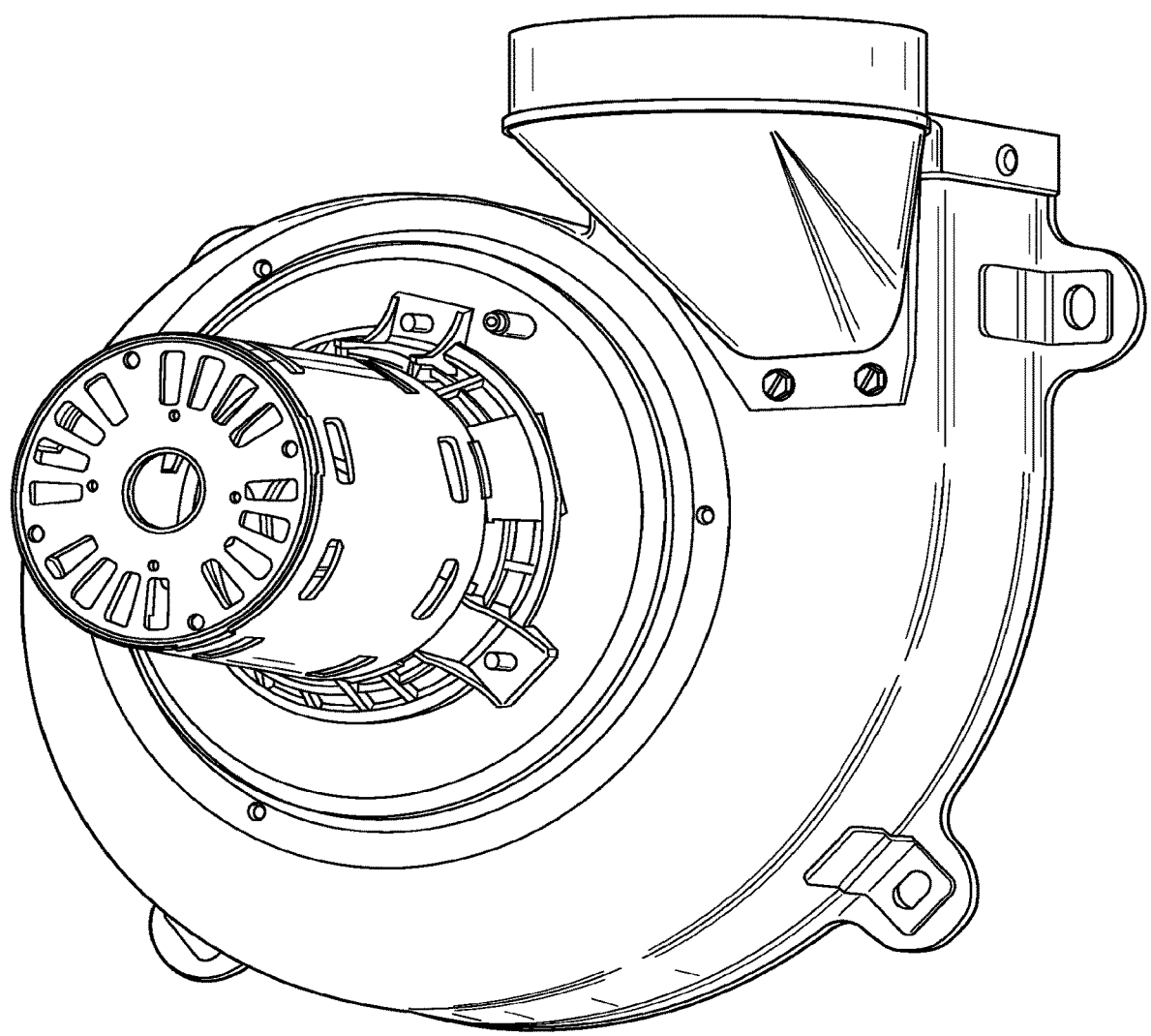
FIG. 8 is an illustration of a prior art induction blower.

FIG. 8 is an illustration of a prior art induction draft blower of a kind used with gas-fueled appliances to draw combustion gases through, and expel such gases from, the appliance. The blower is a pump that moves fluid from an inlet to an outlet. There is no vent or other inlet to allow ingress of ambient air into fluid flow path between the blower inlet and the blower outlet. Further, the blower outlet was connected to the flue pipe in a sealed connection to thereby assure that the flowing exhaust is not interrupted by a high pressure that might otherwise push the exhaust out into the ambient environment in the event of an opening between the flue interior and the ambient environment.

Figure 9:
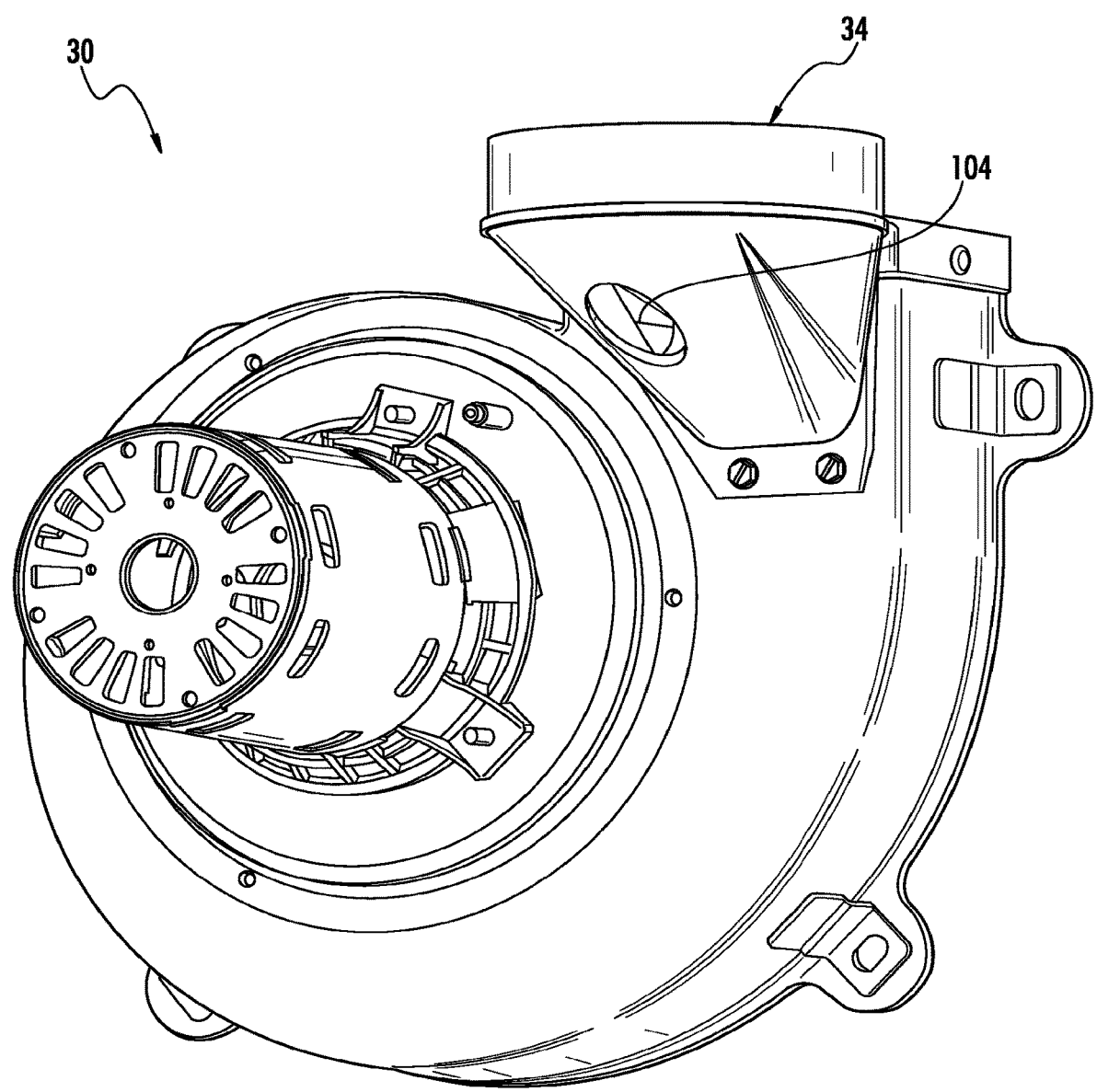
FIG. 9 is an illustration of an induction blower for use with the forced air heating furnace of FIG. 1.

FIG. 9 illustrates an induction draft blower 30 in accordance with an embodiment of the present invention. Blower 30 defines a blower inlet (not shown in FIG. 6; adjacent manifold 51 in FIG. 1) and an upwardly facing blower outlet 34. In accordance with one or more embodiments, an ambient air inlet 104 may be formed in the blower outlet to allow ingress of air into hot combustion gas flowing from the heat exchanger tubes 52 (FIG. 1) and the blower. It is contemplated that the ambient air inlet of embodiments described herein can take many forms. In the embodiment shown in FIG. 9, the ambient air inlet takes the form of an aperture 104 through blower outlet 34 from an area ambient to the blower within furnace housing 16 into the flue gas flow. As the flue gas in this non-condensing furnace is relatively hot, the exhaust gas exiting the blower maintains sufficient negative pressure to maintain a draw of air through inlet 104 into the exhaust flow.

Figure 10:
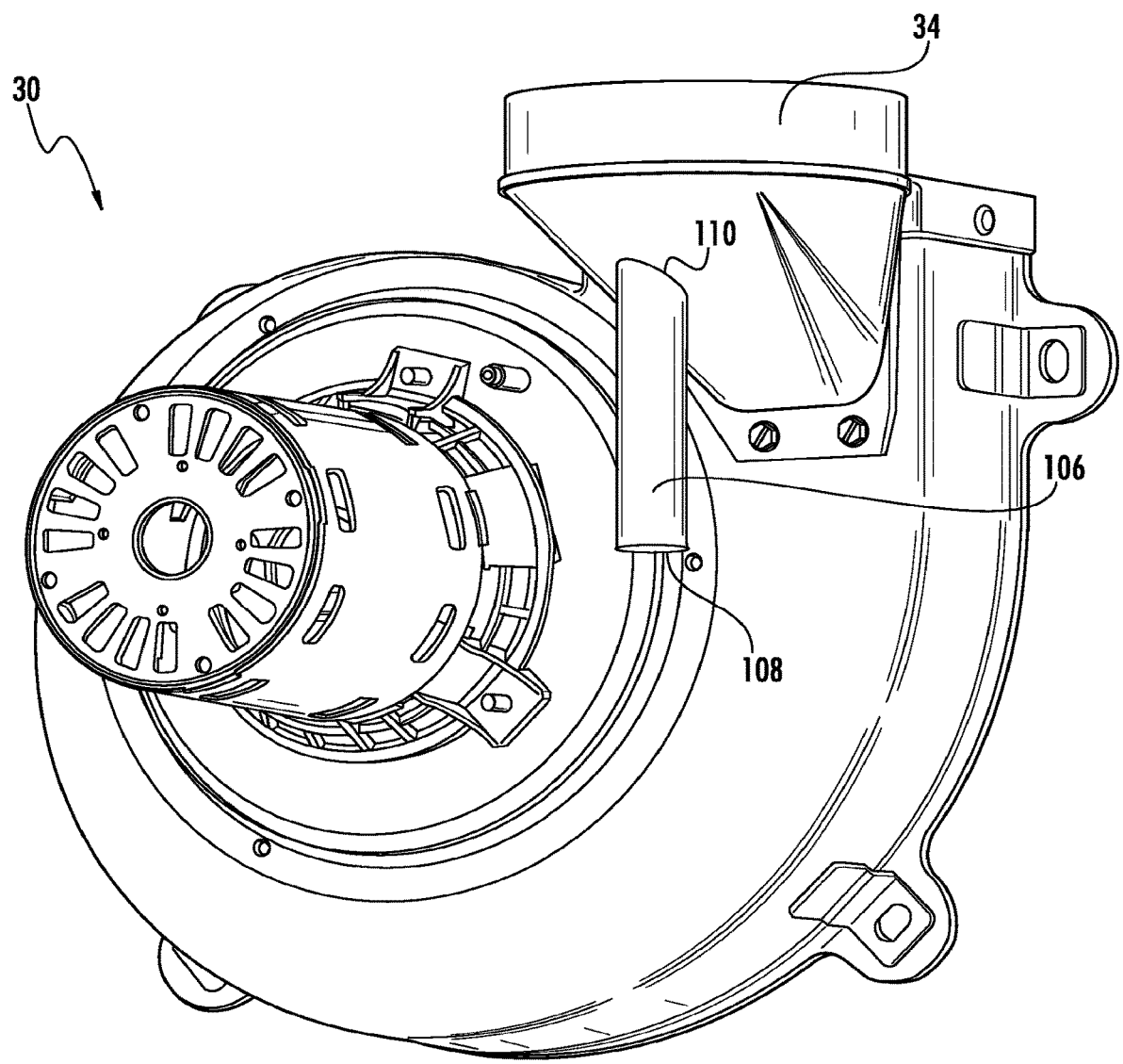
FIG. 10 is an illustration of an induction blower for use with the forced air heating furnace of FIG. 1.

FIG. 10 is an illustration of another induction draft blower in accordance with an embodiment of the invention. Similar to the blower of FIG. 9, the blower of FIG. 10 draws exhaust gas into an inlet side, expels the gas from an upwardly facing blower outlet 34, and has an ambient air inlet that permits the inflow of air ambient the blower and the exhaust flue into the exhaust stream. The ambient air inlet is defined by a cylindrical tube-shaped conduit 106 attached to and extending through a wall of blower outlet 34. Conduit 106 has a first open end 108 that opens into an area ambient to the blower and its exhaust gas flow and has an opposing open end 110 that extends through the wall of outlet 34 and opens into the interior volume of the blower outlet and therefore its exhaust gas flow therein. The conduit defines a through-bore that extends from the first open end to the second open end. The exhaust gas flow across the opening of tube end 110 creates a pressure relatively lower than the pressure at end 108, creating an ambient air flow through the tube and into the exhaust flow. Thus, tube 106 is operable to conduct a flow of drier ambient air through the conduit and into the flue interior above outlet 34 and, therefore, into the exhaust gas flow. As shown, end 110 extends through and is affixed to a through-hole in the blower outlet 34 as shown in FIG. 9 by suitable means, such as by welding. Conduit 106 may be made of a suitable metal, polymer, or other material.

Figure 11:
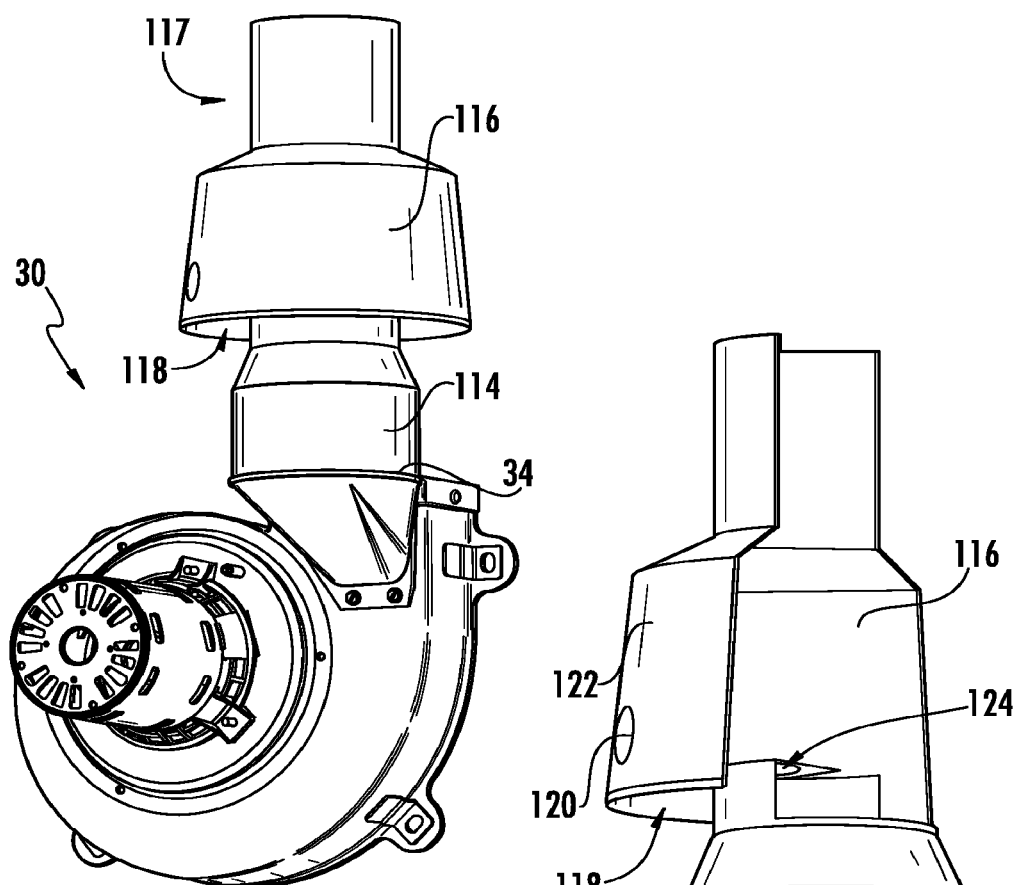
FIG. 11 is an illustration of an induction blower for use with the forced air heating furnace of FIG. 1.
Figure 12:
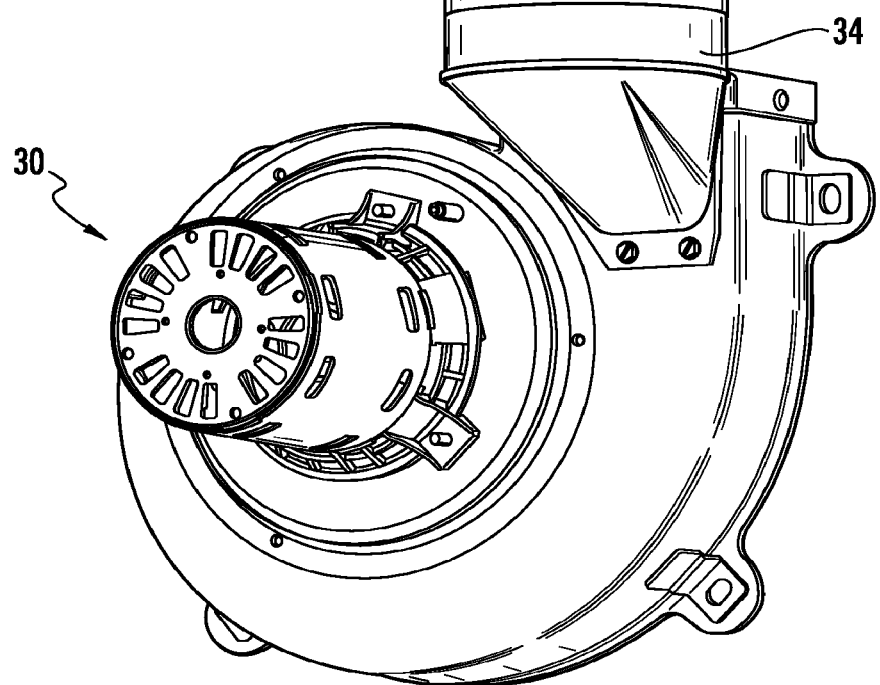
FIG. 12 is a partial sectional view of the induction blower of FIG. 8.

FIG. 11 illustrates another high pressure blower in accordance with an embodiment of the invention, in which outlet 34 includes a generally cylindrical extension 114 that extends upward beyond the blower and into a generally cylindrical lower hood or skirt 116 of a flue pipe 117. As indicated in FIG. 11 and the section in FIG. 12, the inner diameter of hood 116 extends radially (from the perspective of exhaust gas flow) outward from the outer diameter of extension 114, at least over the range at which extension 114 and hood 116 overlap in the vertical direction, leaving a gap 118 therebetween. Exhaust gas from blower outlet 34 and extension 114 flows upward through one or more holes 124 in a top surface of extension 114 into the flue pipe. Being generally warmer than the surrounding air, the exhaust gas continues upward into the flue pipe, drawing ambient air into the exhaust flow through gap 118 and thereby mixing the ambient air and the exhaust gas. An additional through-hole 120 may be provided to prevent spillage when the flue is blocked.

It should be noted that flue pipe hood 116 and extension 114 may be removable pieces that are selectively attached to more primary components of flue pipe 117 and outlet 34, respectively, and also that these components overlap the blower outlet and the flue pipe so that there is no clear distinction between the components. It should be understood that the blower outlet and flue pipe may take many forms within the scope of the present disclosure.

As noted above, the control system operates the gas valve and the exhaust blower so that the warm up period needed to bring the combustion chamber and the flue gases to their normal operating temperatures moves from ten seconds to about ninety seconds. At start up, the internal flue pipe temperature may be below the dew point, while at normal operating levels, the flue pipe temperature will be above the dew point. Whenever the flue pipe temperature is below the dew point, condensation may accumulate on the flue pipe inner wall. During the furnace's warm up, combustion gases may include substances that may condense out of the exhaust flow and thereby accumulate on the flue pipe walls, causing fouling of the flue pipe and damage to the blower if the condensate slides down into outlet 34. The inclusion of a through hole in the blower outlet and/or the flue pipe allows the introduction of drier, ambient air, which inhibits the formation of condensation on the blower outlet and flue pipe inner wall. It is believed that the incoming ambient air, being drier than the exhaust gas, reduces the relative humidity within the flue pipe, i.e. reduces the moisture within the gas flowing through the flue (if considered as a percentage of moisture needed for saturation of the flowing gas). Additionally, the infusion of ambient air into the exhaust gas may dilute the amount of carbon dioxide in the overall gas flow in the flue, thereby lowering the dew point so that temperature within the flue pipe crosses the dew point more quickly. In either or both events, the infusion of ambient air results in a lower amount of condensation on the interior walls of flue pipe 12.

It will be understood from the present disclosure that the functions ascribed to controller 21 may be embodied by computer-executable instructions of a program that is embodied on a computer-readable medium and that executes on one or more computers that may be considered controller 21, for example including or embodied by a processor such as a microprocessor or a programmable logic controller (PLC). Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a random access memory (RAM), a read-only memory (ROM), an erasable programmable read-only memory (EPROM or flash memory), a non-volatile memory supporting a PLC, memory incorporated into a processor, or other optical or magnetic storage devices. Generally, program modules include routines, programs, components, data structures, etc., that perform particular tasks and/or implement particular abstract data types. Moreover, those skilled in the art will appreciate that the systems/methods described herein may be practiced with various controller configurations, including programmable logic controllers, simple logic circuits, single-processor or multi-processor systems, remote and mobile devices, and the like. Aspects of these functions may also be practiced in distributed computing environments, for example in so-called "smart home" arrangements and systems, where tasks are performed by remote processing devices that are linked through a local or wide area communications network to the components otherwise illustrated in the figures. In a distributed computing environment, programming modules may be located in both local and remote memory storage devices. Thus, controller 21 may comprise a computing device that communicates with the system components described herein via hard wire or wireless local or remote networks and may itself comprise in whole or in part a processing device remote from water heater 100 and that communicates with other components at the water heater wirelessly or by other means.

A controller that could effect the functions described herein for controller 21 may be mounted to housing 16 of furnace 10 and may include a processing unit, a system memory and a system bus. The system bus couples the system components including, but not limited to, system memory to the processing unit. The processing unit can be any of various available programmable devices, including one or more microprocessors or field programmable gate arrays or other devices, and it is to be appreciated that dual microprocessors, multi-core and other multi-processor architectures can be employed as the processing unit.

Software applications may act as an intermediary between users and/or other computers or devices and the basic computer resources of controller 21, as described, in suitable operating environments. Such software applications include one or both of system and application software. System software can include an operating system that acts to control and allocate resources of controller 21. Application software takes advantage of the management of resources by system software through the program models and data stored on system memory. Such application software, or programmed instructions, are stored on local memory as described above that forms a part of controller 21, while the controller may also be considered to encompass other memory that stores data used by the application and that is remote from the board or package on which the controller's process or is located but that is in communication with the processor.

The controller may also, but does not necessarily, include one or more interface components that are communicatively coupled through the bus and facilitate interaction with the controller. By way of example, the interface component can be a port (e.g., serial, parallel, PCMCIA, USC, or FireWire) or an interface card, or the like and may include relays as needed to provide the controller the ability to control switches and electrical components (such as igniter 95) and/or mechanical components (such as valve 72 and blowers 56 and 30), as should be understood in this art. The interface component can receive input and provide output (wired or wirelessly). For instance, input can be received from devices including but not limited to a pointing device such as a mouse, track ball, stylus, touch pad, key pad, touch screen display, keyboard, microphone, joy stick, gamepad, satellite dish, scanner, camera, or other component. Output can also be supplied by controller 21 to output devices via the interface component. Output devices can include displays (for example cathode ray tubes, liquid crystal display, light emitting diodes, or plasma) whether touch screen or otherwise, speakers, printers, and other components, such as relays and the devices controlled by the relays. In particular, by such means, controller 21 may receive inputs from, and direct outputs to, the various components with which controller 21 communicates, as described herein.

While one or more preferred embodiments of the invention are described above, it should be appreciated by those skilled in the art that various modifications and variations can be made in the present invention without departing from the scope and spirit thereof. For example, elements of one embodiment may be combined with another embodiment to create a still further embodiment. It is intended that the present invention cover such modifications and variations as come within the scope and spirit of the present disclosure, the appended claims, and there equivalents.

What is claimed is:

1. A fuel-fired heating appliance comprising:
    a burner;
    a mixing chamber having a first portion and a second portion, the mixing chamber being in fluid communication with the burner, the first portion including an ambient air inlet and a neck region, wherein the neck region restricts flow of air and fuel, the neck region comprising an inlet funnel portion and an outlet funnel portion disposed in a symmetric arrangement, wherein an air diffuser is disposed in the first portion of the mixing chamber upstream of the neck portion, and a gas delivery orifice is disposed through a center of the diffuser;
    a first fuel flow path in fluid communication with the first portion of the mixing chamber;
    a first valve configured to selectively permit fuel to flow through the first fuel flow path;
    a second fuel flow path in fluid communication with the second portion of the mixing chamber;
    a second valve configured to selectively permit fuel to flow through the second fuel path;
    an air flow path between an air source and the burner, the air flow path extending through at least a portion of the mixing chamber;
    an air moving device configured to move air through the mixing chamber and the burner;
    a controller configured to:
        output instructions for the second valve to at least partially open, thereby permitting fuel to flow through the second fuel flow path and to the second portion of the mixing chamber;
        output instructions for the air moving device to (i) move air at a first speed into the mixing chamber, thereby creating a fuel-air mixture, wherein the first speed is lower than a predetermined steady-state speed, and (ii) move the fuel-air mixture to the burner;
        subsequent to ignition of the fuel-air mixture proximate the burner, determine a second speed that is greater than the first speed;
        output instructions for the air moving device to move air at the second speed; and
        output instructions for the first valve to at least partially open, thereby permitting fuel to flow through the first fuel flow path and to the first portion of the mixing chamber, thereby creating the fuel-air mixture in the first portion of the mixing chamber.

2. The fuel-fired heating appliance of claim 1, wherein the controller is further configured to:
    output instructions for the second valve to close following the first valve at least partially opening.

3. The fuel-fired heating appliance of claim 2, wherein the controller is further configured to:
    output the instructions for the second valve to close after expiration of a predetermined duration following the output of the instructions for the first valve to at least partially open.

4. The fuel-fired heating appliance of claim 1, wherein outputting instructions for the first valve to at least partially open further causes the fuel to sequentially flow through the first portion of the mixing chamber and the second portion of the mixing chamber.

5. The fuel-fired heating appliance of claim 1, wherein the first portion of the mixing chamber comprises a Venturi structure.

6. The fuel-fired heating appliance of claim 1, wherein the first fuel flow path and the air flow path at least partially overlap.

7. The fuel-fired heating appliance of claim 1, wherein the first fuel flow path and the second fuel flow path receive fuel from a shared fuel source.

8. The fuel-fired heating appliance of claim 1, wherein the burner comprises a mesh defining a plurality of domes.

9. The fuel-fired heating appliance of claim 8, wherein each of the plurality of domes extends in a downflow direction of the fuel-air mixture and/or combustion gases resulting from combustion of the fuel-air mixture.

10. The fuel-fired heating appliance of claim 1, wherein an air-fuel ratio of the fuel-air mixture is fuel-richer when (i) the second valve is at least partially opened and the air moving device is moving air at the first speed than when (ii) the first valve is at least partially opened and the air moving device is moving air at the second speed.

11. The fuel-fired heating appliance of claim 1 further comprising:
   a third valve configured to selectively permit fuel to flow to the second fuel flow path, the controller being configured to output instructions for operation of the third valve.

12. The fuel-fired heating appliance of claim 11, wherein the third valve is a pilot valve to the first valve such that the third valve causes the first valve to close when the third valve closes.

13. The fuel-fired heating appliance of claim 1, wherein the air moving device is an induction draft blower.

14. The fuel-fired heating appliance of claim 1, wherein:
   the first valve is configured to permit fuel to flow through the first fuel flow path at a first flow rate,
   the second valve is configured to permit fuel to flow through the second fuel flow path at a second flow rate, and
   the second flow rate is lower than the first flow rate.

* * * * *